(12) United States Patent
Hara et al.

(10) Patent No.: US 7,738,341 B2
(45) Date of Patent: Jun. 15, 2010

(54) RECORDING AND REPRODUCING APPARATUS, RECORDING AND REPRODUCING METHOD, REPRODUCING APPARATUS, AND REPRODUCING METHOD

(75) Inventors: Masaaki Hara, Tokyo (JP); Kenji Tanaka, Tokyo (JP); Atsushi Fukumoto, Kanagawa (JP); Kenjiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 225 days.

(21) Appl. No.: 12/107,609

(22) Filed: Apr. 22, 2008

(65) Prior Publication Data

US 2008/0310281 A1   Dec. 18, 2008

(30) Foreign Application Priority Data

Jun. 18, 2007   (JP) .............................. 2007-160460

(51) Int. Cl.
*G11B 7/00* (2006.01)

(52) U.S. Cl. ...................................... 369/103
(58) Field of Classification Search .................. None
See application file for complete search history.

(56) References Cited

U.S. PATENT DOCUMENTS

| | | | | |
|---|---|---|---|---|
| 5,416,616 A | * | 5/1995 | Jenkins et al. | 359/11 |
| 6,175,543 B1 | * | 1/2001 | Burr et al. | 369/103 |
| 6,281,993 B1 | * | 8/2001 | Bernal et al. | 359/29 |
| 2003/0095477 A1 | * | 5/2003 | Horimai et al. | 369/13.28 |
| 2004/0037196 A1 | * | 2/2004 | Matsumoto et al. | 369/53.19 |
| 2005/0180291 A1 | * | 8/2005 | Ogasawara | 369/103 |

FOREIGN PATENT DOCUMENTS

| | | |
|---|---|---|
| JP | 2002-083431 | 3/2002 |
| JP | 2007-335056 | 12/2007 |

OTHER PUBLICATIONS

Horimai et al., "Holographic medium for taking off, turning 200 gigabytes storage capacity into reality in 2006," Nikkei Electronics, pp. 106-114, 2005.

(Continued)

*Primary Examiner*—Peter Vincent Agustín
(74) *Attorney, Agent, or Firm*—K&L Gates LLP

(57) ABSTRACT

A recording and reproducing apparatus includes a spatial-light-intensity modulating unit, a spatial-light-phase modulating unit, an optical system that transmits light and leads the light to a hologram recording medium, a converting unit that converts an input data sequence; an amplitude and phase controlling unit that controls, during recording, the spatial-light-intensity modulating unit and the spatial-light-phase modulating unit to generate a signal light and a reference light, and controls, during reproduction, light intensity of each of pixels in a reference light area and a signal light area and controls a phase of each of the pixels, an image-signal acquiring unit that receives the reproduced image and the DC light and obtains two kinds of image signals, a difference calculating unit that calculates a difference between the two kinds of image signals, and a decoding unit that decodes data formed by a combination of the two kinds of values.

18 Claims, 22 Drawing Sheets

OTHER PUBLICATIONS

Japanese Office Action issued on May 12, 2009, for corresponding Japanese Patent Application 2007-160460.

Yasuda, S. et al., "Coaxial holographic data storage without recording the dc components," Optics Letters, vol. 17, pp. 2607-2609, 2006.

Yasuda, S. et al, "Optical noise reduction for dc-removed coaxial holographic data storage," Optics Letters, vol. 32, pp. 160-162, 2007.

Yasuda, S. et al., "Optical noise reduction by reconstructing positive and negative images from Fourier holograms in coaxial holographic storage systems," Optics Letters, vol. 31, pp. 1639-1641, 2006.

* cited by examiner

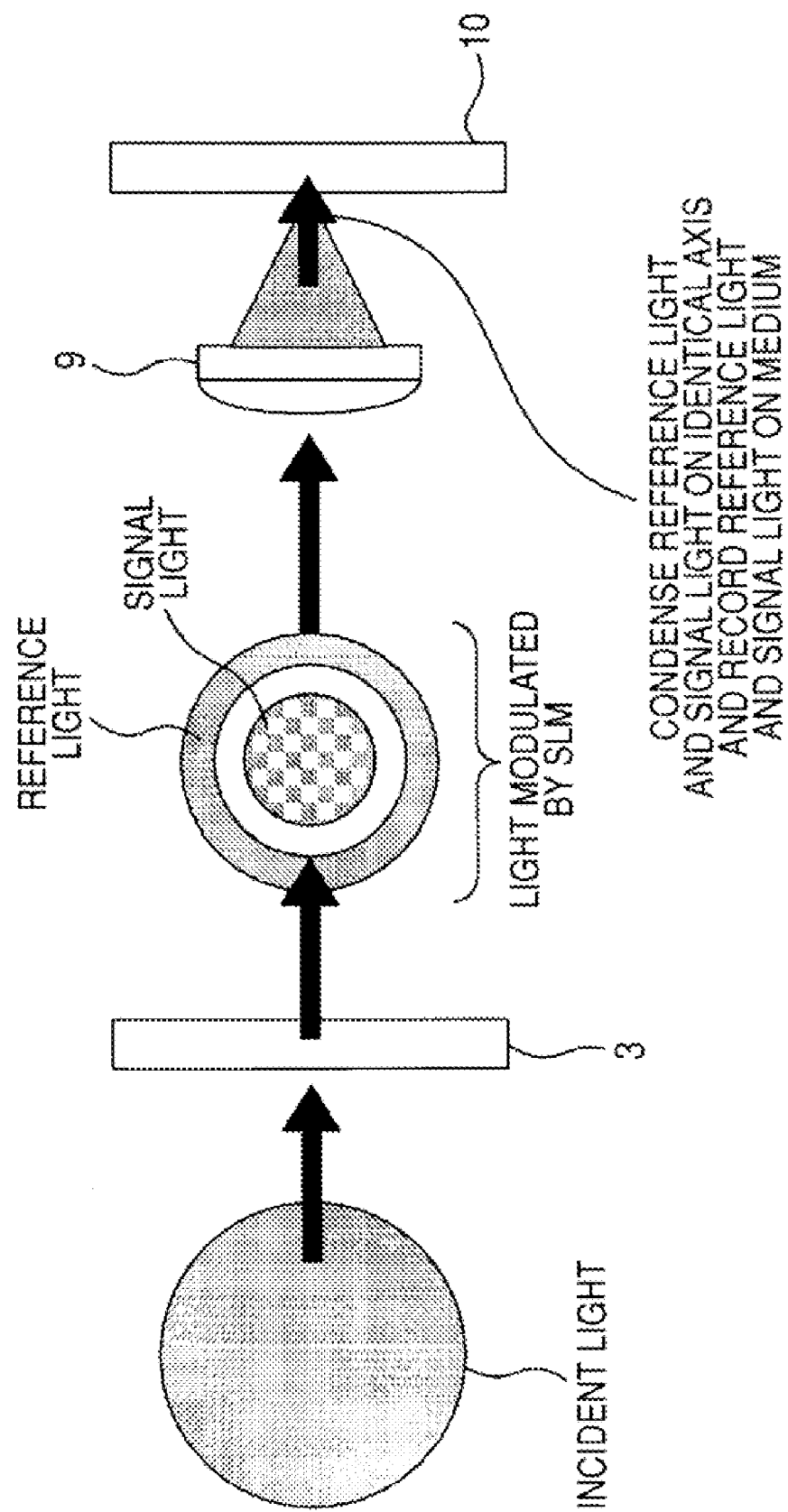

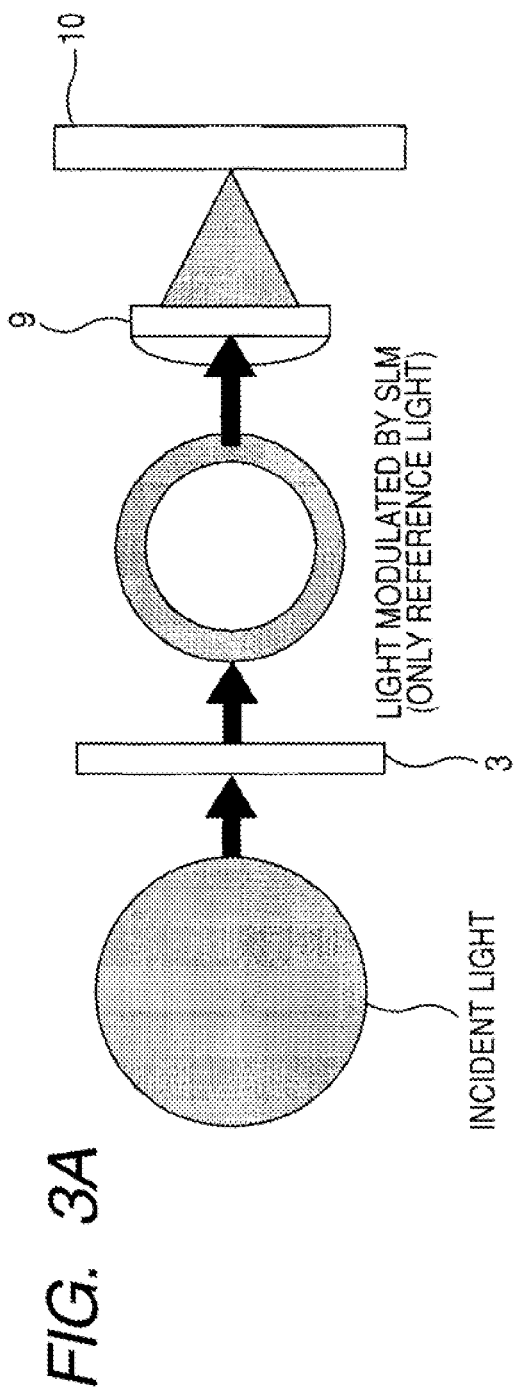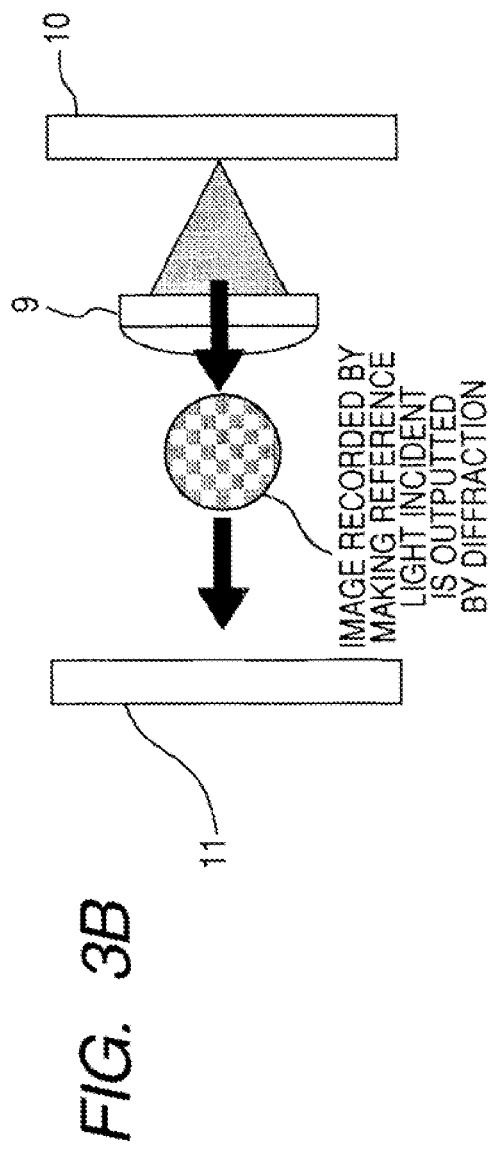

VOLTAGE OFF
(PHASE: d×nh)

VOLTAGE ON
(PHASE: d×nv)

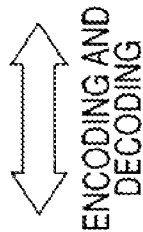

ADD AMPLITUDE a OF PHASE 0π TO SIGNAL OF ARBITRARY PHASE

ADD AMPLITUDE a OF PHASE π TO SIGNAL OF ARBITRARY PHASE

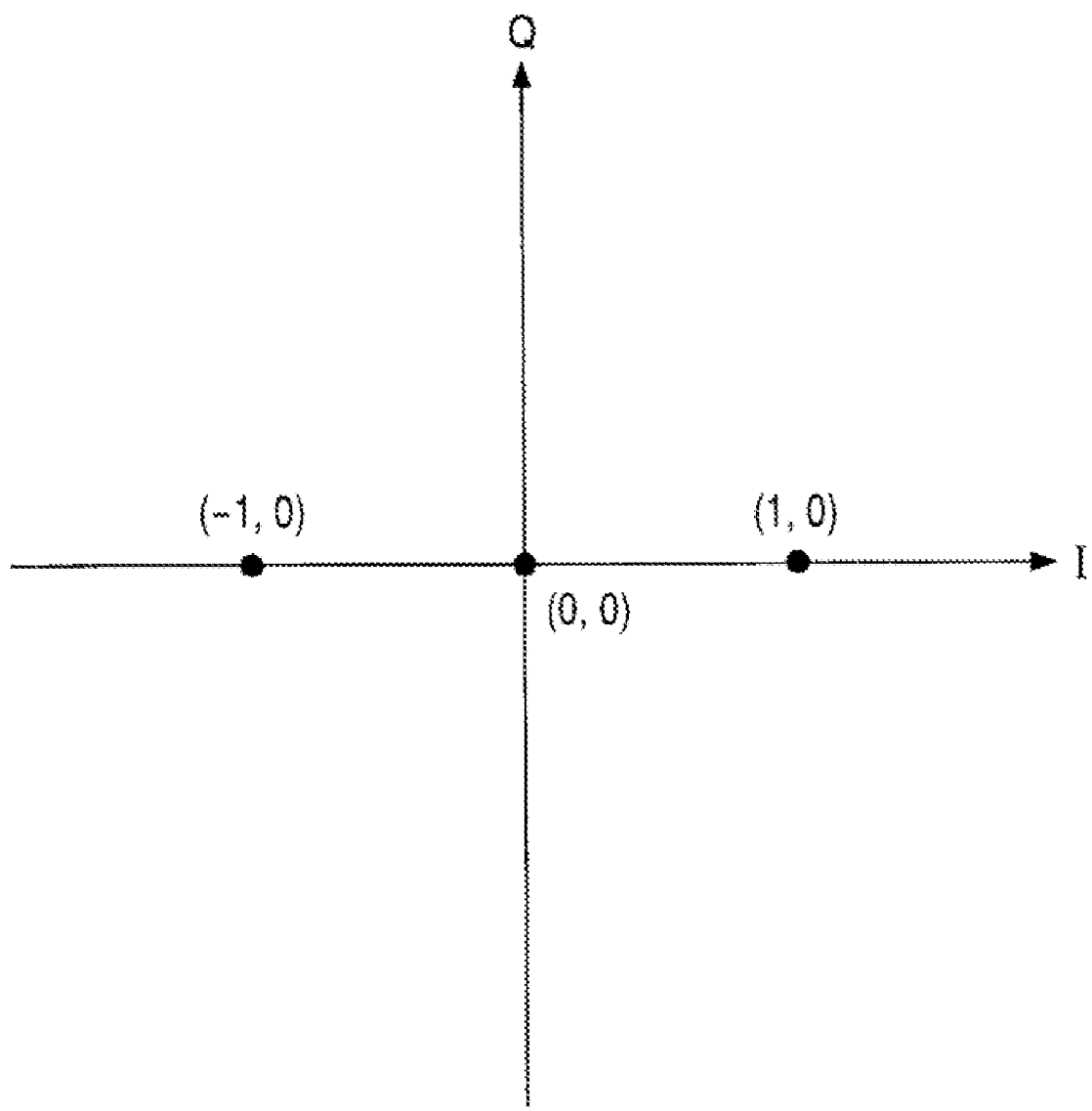

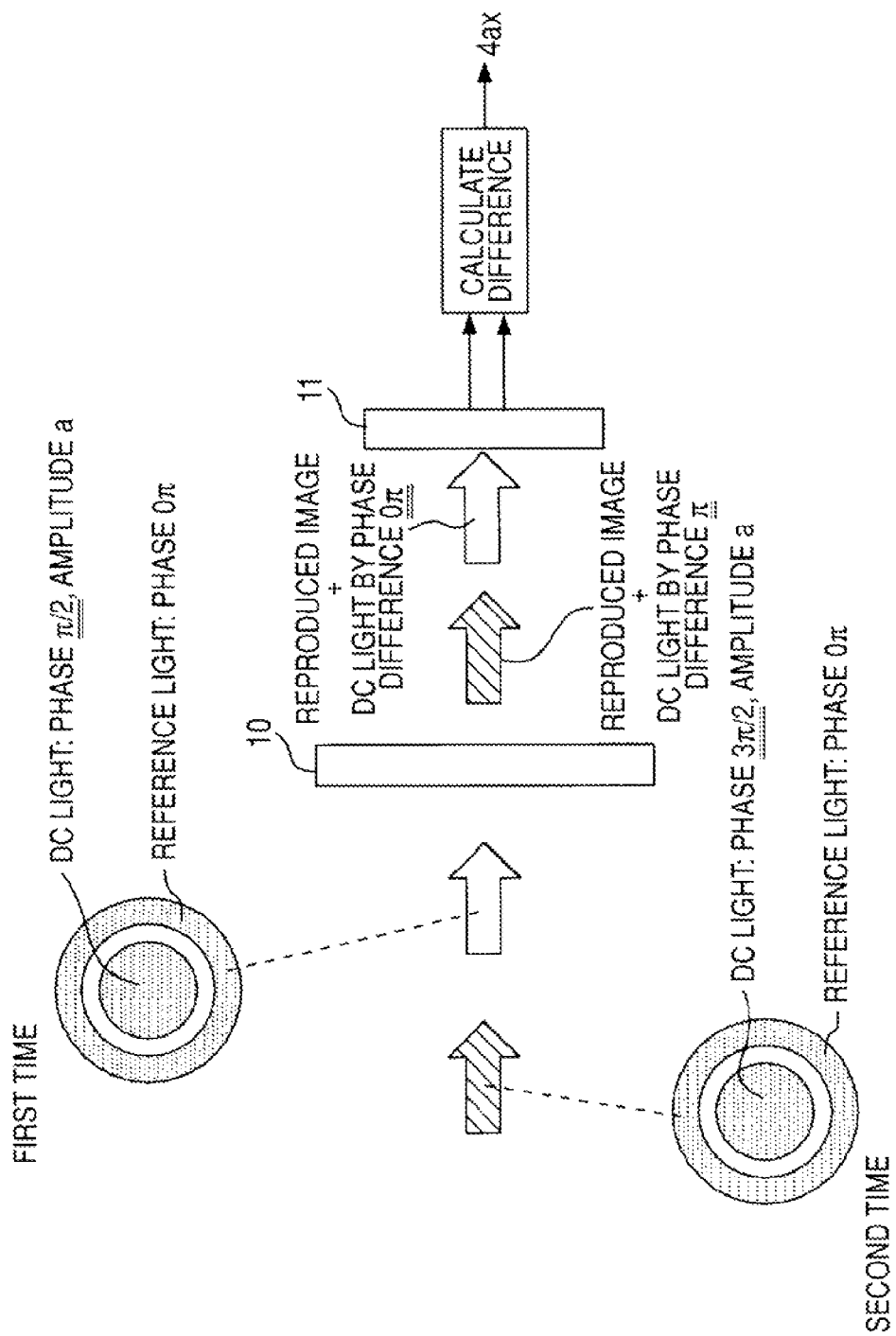

ADD AMPLITUDE a OF PHASE π/2 TO SIGNAL OF ARBITRARY PHASE

ADD AMPLITUDE a OF PHASE 3π/2 TO SIGNAL OF ARBITRARY PHASE

RECORDING AND REPRODUCING APPARATUS, RECORDING AND REPRODUCING METHOD, REPRODUCING APPARATUS, AND REPRODUCING METHOD

CROSS-REFERENCES TO RELATED APPLICATIONS

The present application claims priority to Japanese Patent Application JP 2007-160460 filed in the Japanese Patent Office on Jun. 18, 2007, the entire contents of which is being incorporated herein by reference.

BACKGROUND

The present application relates to a recording and reproducing apparatus that records data in and reproduces the data from a hologram recording medium in which the data is recorded by an interference fringe between reference light and signal light and a method of recording and reproducing the data. The present application also relates to a reproducing apparatus that reproduces data from the hologram recording medium and a method of reproducing the data.

In a hologram recording and reproducing system and, in particular, a hologram recording and reproducing system in the field of optical storages, for example, a transmission liquid crystal panel and an SLM (spatial light modulator) such as a DMD (Digital Micromirror Device: registered trademark) are used for light intensity modulation. Intensity modulation for obtaining pattern arrays of bit 1 (e.g., light intensity is high) and bit 0 (e.g., light intensity is low) is applied to signal light.

In the SLM, for example, as shown in FIG. 2, signal light is generated by giving light intensity modulation to the center thereof according to recorded data and reference light is generated by transmitting light in a ring shape around the signal light. The signal light modulated according to the recorded data is irradiated on a hologram recording medium together with the reference light. Consequently, an interference fringe between the signal light and the reference light is recorded on the hologram recording medium as data.

When the data is reproduced, only the reference light is generated and irradiated on the hologram recording medium by the SLM to obtain diffractive light corresponding to the interference fringe. An image corresponding to the diffractive light is focused on an image sensor such as a CCD (Charge Coupled Device) sensor or a CMOS (Complementary Oxide Semiconductor) sensor to obtain respective values of recording bits and perform data reproduction.

The hologram recording and reproducing system for irradiating the signal light and the reference light on an identical optical axis is known as a coaxial system.

Examples of a related art include "Nikkei Electronics, Jan. 17, 2005, p. 106 to 114".

SUMMARY

The technique for hologram recording and reproduction described above is prospective as a mass data storage technique in the next generation that replaces various optical disk media, HDDs (Hard Disc Drives), and the like put to practical use under the present situation. In view of such a point, as a technique for hologram recording and reproduction, a further increase in a data storage capacity is desired.

According to an embodiment, there is provided a recording and reproducing apparatus that records data in and reproduces the data from a hologram recording medium in which the data is recorded by an interference fringe between reference light and signal light. The recording and reproducing apparatus includes spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium.

The recording and reproducing apparatus includes converting means for converting an input data sequence formed by a combination of two kinds of values into a data sequence formed by a combination of at least three kinds of values.

The recording and reproducing apparatus includes amplitude-and-phase controlling means. The amplitude-and-phase controlling means controls, concerning a reference light area for generating the reference light and a signal light area for generating a signal light decided in advance in the spatial-light-intensity modulating means and the spatial-light-phase modulating means, during recording, the spatial-light-intensity modulating means and the spatial-light-phase modulating means such that light intensity and a phase of each of pixels in the signal light area are a combination of necessary light intensity and a phase 0 or π allocated according to each of values of the data sequence obtained by the converting means and controls the spatial-light-intensity modulating means and the spatial-light-phase modulating means such that light intensity and a phase in the reference light have predetermined patterns and causes the spatial-light-intensity modulating means and the spatial-light-phase modulating means to generate the signal light and the reference light.

The amplitude-and-phase controlling means controls, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controls, for the spatial-light-phase modulating means, every time data for one hologram page recorded on the hologram recording medium is read out, a phase of each of the pixels in the signal light area and the reference light area such that two states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and π, respectively, are obtained.

The recording and reproducing apparatus includes image-signal acquiring means for receiving the reproduced image and the DC light obtained when two kinds of the DC light and the reference light, which are generated according to the control for each hologram page during reproduction by the amplitude-and-phase controlling means, are guided to the hologram recording medium by the optical system and obtaining two kinds of image signals based on a result of the light reception.

Moreover, the recording and reproducing apparatus includes difference calculating means for calculating a difference between the two kinds of image signals obtained by the image-signal acquiring means and decoding means for decoding data formed by a combination of the two kinds of values on the basis of a result of the difference calculation by the difference calculating means.

According to another embodiment, there is provided a recording and reproducing apparatus that records data in and reproduces the data from a hologram recording medium in which the data is recorded by an interference fringe of reference light and signal light. The recording and reproducing apparatus includes spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium.

The recording and reproducing apparatus includes converting means for converting an input data sequence formed by a combination of two kinds of values into a data sequence formed by a combination of at least three kinds of values.

The recording and reproducing apparatus includes amplitude-and-phase controlling means. The amplitude-and-phase controlling means controls, concerning a reference light area for generating the reference light and a signal light area for generating a signal light decided in advance in the spatial-light-intensity modulating means and the spatial-light-phase modulating means, during recording, the spatial-light-intensity modulating means and the spatial-light-phase modulating means such that light intensity and a phase of each of pixels in the signal light area are modulated according to each of values of the data sequence obtained by the converting means and controls the spatial-light-intensity modulating means and the spatial-light-phase modulating means such that light intensity and a phase in the reference light have predetermined patterns and causes the spatial-light-intensity modulating means and the spatial-light-phase modulating means to generate the signal light and the reference light.

The amplitude-and-phase controlling means controls, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controls, for the spatial-light-phase modulating means, every time data for one hologram page recorded on the hologram recording medium is read out, a phase of each of the pixels in the signal light area and the reference light area such that four states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0, π, π/2, and 3π/2, respectively, are obtained.

The recording and reproducing apparatus includes image-signal acquiring means for receiving the reproduced image and the DC light obtained when four kinds of the DC light and the reference light, which are generated according to the control for each hologram page during reproduction by the amplitude-and-phase controlling means, are guided to the hologram recording medium by the optical system and obtaining four kinds of image signals based on a result of the light reception.

The recording and reproducing apparatus includes difference calculating means for calculating a difference between two kinds of image signals obtained as a result of reception of the DC light and the reproduced image having the phase differences of 0 and π, respectively, among the four kinds of image signals obtained by the image-signal acquiring means and a difference between two kinds of image signals obtained as a result of reception of the DC light and the reproduced image having the phase differences of π/2 and 3π/2, respectively, among the four kinds of image signals.

Moreover, the recording and reproducing apparatus includes decoding means for decoding data formed by a combination of the two kinds of values on the basis of a result of the difference calculation, which is obtained by the difference calculating means, for the two kinds of image signals obtained as a result of reception of the DC light and the reproduced image having the phase differences of 0 and π and a result of the difference calculation, which is obtained by the difference calculating means, for the two kinds of image signals obtained as a result of reception of the DC light and the reproduced image having the phase differences of π/2 and 3π/2.

Information on phases can be recorded on the hologram recording medium together with information on light intensity (information on amplitudes).

According to an embodiment, the data sequence formed by the combination of the two kinds of values is converted into the data sequence formed by the three or more kinds of values and amplitude and a phase of each of pixels are controlled according to each of values of the data sequence formed by the three or more kinds of values. Then, it is possible to record information with a number of bits smaller than that in controlling only ON and OFF of amplitude to record data according to the data sequence formed by the combination of the two kinds of values as in the past. In other words, it is possible to record a larger amount of information under a condition of a limited number of pixels.

Moreover, according to an embodiment, during reproduction, two kinds of DC lights with predetermined light intensity, phase differences of which with respect to a reproduced image obtained by irradiation of reference light are 0 and π, are added to the reproduced light to read out data. A difference between two kinds of image signals obtained as a result of reading out data is calculated and the data sequence formed by the combination of the two kinds of values is decoded from a result of the calculation.

Alternatively, four kinds of DC lights with predetermined light intensity, phase differences of which with respect to a reproduced image are 0, π, π/2, and 3π/2, are added to the reproduced light to read out data. A difference between two kinds of image signals obtained by adding DC lights with the phase differences of 0 and π to the reproduced image and a difference between two kinds of image signals obtained by adding up DC lights with the phase differences of π/2 and 3π/2 to the reproduced image are calculated. The data sequence formed by the combination of the two kinds of values is decoded from two results of the difference calculation.

According to an embodiment, two kinds of DC lights with predetermined light intensity, the phase differences of which with respect to a reproduced image area are 0 and π, are added to the reproduced image to read out data and a difference between two kinds of image signals obtained as a result of reading out data is calculated as described above. Then, as described later, an image signal correctly representing a signal recorded as a combination of certain amplitude and the phase "0" or "π" is obtained. Consequently, the data sequence formed by the combination of the three or more kinds of values is correctly read. When the data sequence recorded as the combination of the three or more kinds of values can be correctly obtained in this way, it is possible to correctly reproduce the original data sequence formed by the combination of the two values by performing decoding based on the data sequence correctly read out in this way as a result of the difference calculation as described above.

A difference between the respective image signals at the time when the two kinds of DC light, the phase differences of which with respect to the reproduced image are 0 and $\pi$, are added up is calculated as described above. Moreover, a difference between image signals at the time when two kinds of DC light, the phase differences of which with respect to the reproduced image are $\pi/2$ and $3\pi/2$, are added up is calculated. Then, as described later, a signal recorded as a combination of an arbitrary amplitude and an arbitrary phase is correctly represented by image signals as results of the difference calculation. In other words, since the image signals as the results of the difference calculation are obtained, the data sequence formed by the combination of the three or more kinds of values recorded as the combination of the arbitrary amplitude and the arbitrary phase is correctly read. According to the embodiment, decoding is performed on the basis of these two results of the difference calculation. Consequently, it is possible to correctly reproduce the original data sequence formed by the combination of the two values from the data sequence formed by the combination of the three or more kinds of values.

As described above, according to an embodiment, since record modulation and encoding are performed by combining amplitudes and phases, it is possible to represent same information with the number of bits smaller than that in the past. As a result, it is possible to increase a data recording capacity. Moreover, it is possible to properly reproduce information on the recorded combination of the amplitude and the phase and correctly reproduce recorded data.

Additional features and advantages are described herein, and will be apparent from the following Detailed Description and the figures.

BRIEF DESCRIPTION OF THE FIGURES

FIG. 2 is a diagram for explaining a method of recording data on a hologram recording medium;

FIGS. 3A and 3B are diagrams for explaining a method of reproducing data from the hologram recording medium;

FIGS. 11A and 11B are diagrams for explaining a recording and reproducing method according to the first embodiment and showing an example of record modulation and encoding of the recording and reproducing method;

FIG. 14 is a diagram representing signal points of three values "−1", "0", and "1" with respect to an I axis and a Q axis;

FIG. 15 is a diagram schematically showing an overview of an operation during reproduction performed in the recording and reproducing apparatus according to the first embodiment;

DETAILED DESCRIPTION

Figure 1:
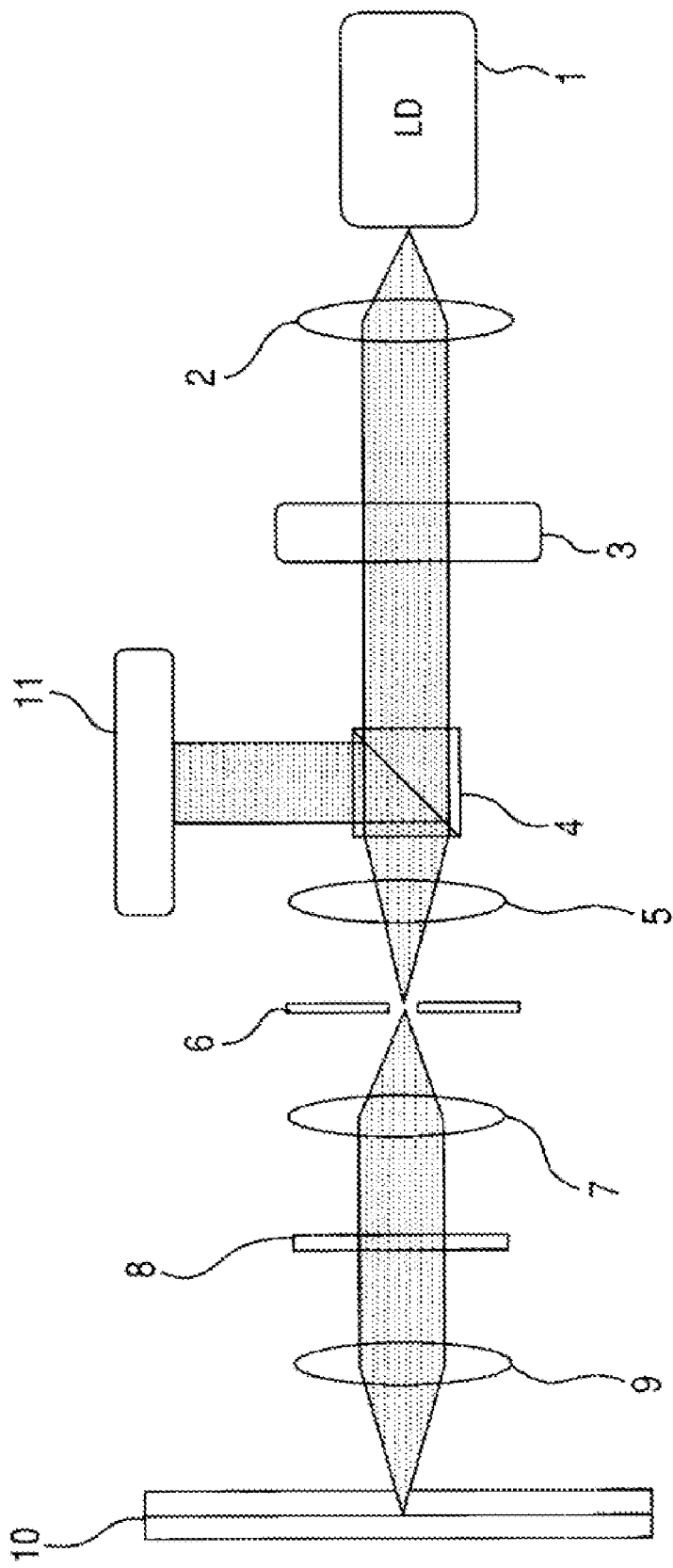
FIG. 1 is a diagram for explaining a basic operation of hologram recording and reproduction and showing an example of the internal structure of a hologram recording and reproducing apparatus employing a coaxial system.

An embodiments will be hereinafter explained with reference to the accompanying drawings and as identified below:
1. Explanation of a basic operation of hologram recording and reproduction
 1-1. Example of basic apparatus structure and operation
 1-2. Recording system employing a phase mask
2. Recording and reproduction according to the embodiments
 2-1. First embodiment
 2-2. Second embodiment
3. Modification 1. Explanation of a basic operation of hologram recording and reproduction
1-1. Example of basic apparatus structure and operation FIG. 1 is a diagram showing the internal structure of a hologram recording and reproducing apparatus employing, for example, a coaxial system. In FIG. 1, only the structure of an optical system of the recording and reproducing apparatus is mainly extracted and shown and other components are not shown.

The coaxial system is a system for, as described above, arranging signal light and reference light on an identical axis, irradiating both the signal light and the reference light on a hologram recording medium set in a predetermined position to perform data recording by an interference fringe, and, during reproduction, irradiating the reference light on the hologram recording medium to reproduce the data recorded by the interference fringe.

In FIG. 1, the structure of a recording and reproducing apparatus that uses a reflective hologram recording medium including a reflective film as a hologram recording medium is shown as an example.

A laser diode (LD) 1 is provided as a light source for obtaining a laser beam for recording and reproduction. As the laser diode 1, for example, a laser diode with an external resonator is adopted. A wavelength of a laser beam is set to, for example, 410 nm.

Emitted light from the laser diode 1 passes through a collimator lens 2 and, then, is made incident on an SLM (spatial-light modulating unit) 3.

The SLM 3 is formed of, for example, a transmissive liquid crystal panel. When respective pixels of the SLM 3 are controlled to be driven according to a driving signal from a not-shown driving circuit, the SLM 3 applies light intensity modulation corresponding to recorded data to the incident light. Specifically, pixels turned on by the driving signal transmit the incident light and pixels turned off by the driving signal do not transmit the incident light. In this way, it is possible to perform ON/OFF control of light in pixel units. According to such ON/OFF control of the SLM 3, it is possible to record data of "0" and "1" in pixel units.

The light subjected to spatial light modulation in the SLM 3 is transmitted through a polarization beam splitter 4 and, then, passes through a relay lens optical system in order of a relay lens 5, a shielding mask 6, and a relay lens 7. The light further passes through a quarter-wave plate 8 and, then, is condensed by an object lens 9 and irradiated on a hologram recording medium 10.

During recording, as described later, signal light subjected to spatial light intensity modulation corresponding to recorded data in the SLM 3 and reference light of a ring shape concentric with the signal light are generated. In other words, the signal light and the reference light generated in this way are condensed on the hologram recording medium 10 through the path explained above.

On the other hand, during reproduction, light from the laser diode 1 is made incident on the SLM 3 via the collimator lens 2 in the same manner as during recording. During reproduction, the SLM 3 applies spatial light intensity modulation for reproduction to the incident light and generates only reference light. In other words, during reproduction, signal light is not irradiated and only reference light is irradiated on the hologram recording medium 10.

According to the irradiation of the reference light, as described later, diffractive light corresponding to recorded data on the hologram recording medium 10 is obtained. The diffractive light passes through the object lens 9 as reflected light from the hologram recording medium 10 and, then, guided to the polarization beam splitter 4 through the quarter-wave plate 8, the relay lens 7, the shielding mask 6, and the relay lens 5 in this order. In the polarization beam splitter 4, the reflected light from the hologram recording medium 10 guided through the path is reflected and the reflected light is guided to an image sensor 11 as shown in the figure.

The image sensor 11 includes imaging elements such as a CCD (Charge Coupled Device) sensor or a CMOS (Complementary Oxide Semiconductor) sensor. The image sensor 11 receives the reflected light (diffractive light) from the hologram recording medium 10 guided as described above and converts the reflected light into an electric signal.

FIG. 2 and FIGS. 3A and 3B are diagrams for explaining a basic operation of hologram recording and reproduction realized by the structure of the optical system explained above. FIG. 2 shows an operation during recording and FIGS. 3A and 3B show an operation during reproduction.

In FIG. 2, only the SLM 3 and the object lens 9 in the optical system shown in FIG. 1 are extracted and shown. In FIGS. 3A and 3B, only the SLM 3 and the object lens 9 are extracted and shown in FIG. 3A. Only the object lens 9 and the image sensor 11 are extracted and shown in FIG. 3B.

During recording shown in FIG. 2, the SLM 3 applies intensity modulation for arranging the reference light and light given with a light intensity pattern based on data pattern of "0" and "1" (referred to as signal light) on a concentric circle to the incident light.

The light subjected to intensity modulation (i.e., the reference light and the signal light) is condensed on the hologram recording medium 10 by the object lens 9. An interference fringe between the reference light and the signal light formed by the condensation of the light is recorded on the hologram recording medium 10 as data.

During reproduction, first, as shown in FIG. 3A, the SLM 3 applies spatial light intensity modulation to the incident light to generate only reference light and condenses the reference light on the hologram recording medium 10. In this case, the condensed light is subjected to diffraction by an interference fringe corresponding to a data pattern recorded on the hologram recording medium 10 and outputted as reflected light from the hologram recording medium 10. In other words, this diffractive light has a light intensity pattern reflecting recorded data as shown in the figure and performs data reproduction on the basis of a result obtained by detecting an intensity pattern of the diffractive light with the image sensor 11.

Figure 4:
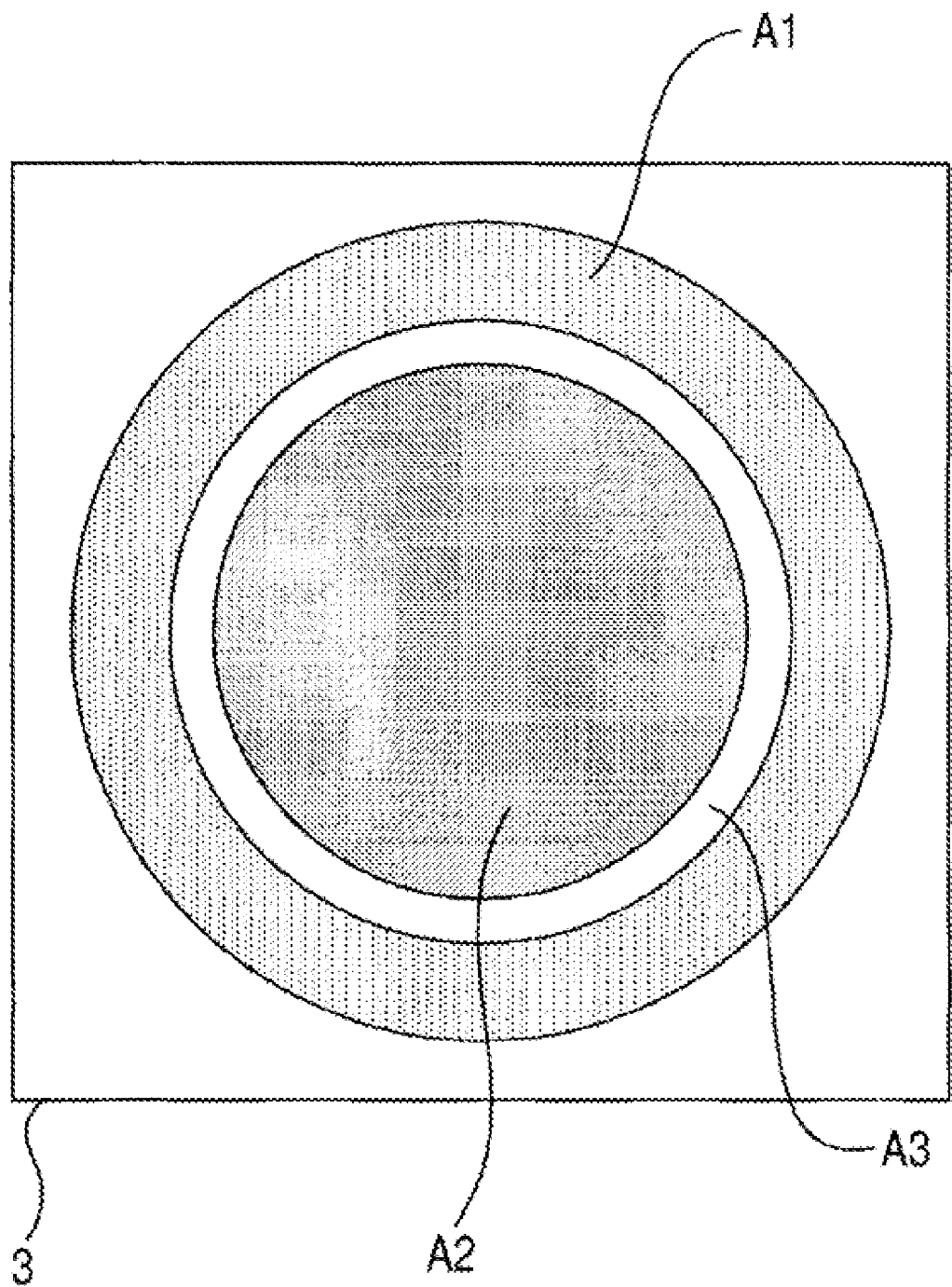
FIG. 4 is a diagram for explaining a reference light area, a signal light area, and a gap area defined in a spatial-light modulating unit.

As described above, in the SLM 3, reference light and signal light are generated according to whether recording or reproduction is performed. Therefore, in the SLM 3, a reference light area A1, a signal light area A2, and a gap area A3 shown in FIG. 4 are defined. As shown in FIG. 4, a predetermined circular area including the center of the SLM 3 is set as the signal light area A2. In an outer peripheral portion of the signal light area A2, the reference light area A1 of a ring shape concentric with the signal light area A2 is set across the gap area A3.

The gap area A3 is set as an area for preventing the reference light from leaking into the signal light area A2 and changing to noise.

During recording, pixels decided in advance in the reference light area A1 are represented as "1" (light intensity is high), the other pixels are represented as "0" (light intensity is low), and the gap area A3 and the entire outer peripheral portion further outside the reference light area A1 are represented as "0". Then, respective pixels in the signal light area A2 are formed in a pattern of "0" and "1" corresponding to recorded data. Consequently, it is possible to generate and output the reference light and the signal light shown in FIG. 2 explained above.

During reproduction, the reference light area A1 is formed in the pattern of "0" and "1" same as that during recording and all the other areas are set to the bit "0". Consequently, it is possible to generate and output only the reference light as shown in FIG. 3A.

1-2. Recording System Employing a Phase Mask

When the basic operation itself of hologram recording and reproduction explained above is performed, it is likely that DC components with extremely high signal intensity proportional to the number of "1"s in the signal light area A2 are recorded.

In general, in hologram recording and reproduction, it is assumed that a hologram page is multiplexed and recorded on the hologram recording medium 10. Taking this assumption into account, a portion where the DC components described above are recorded is a portion where it is difficult to redundantly record other hologram pages. As a result, the respective hologram pages have to be recorded spaces apart from one another and an increase in a recording capacity is not realized.

Therefore, in the past, for example, a method of using a phase mask described in JP-A-2006-107663 is proposed as a method of suppressing such DC components and realizing an increase in a recording capacity.

Figure 5:
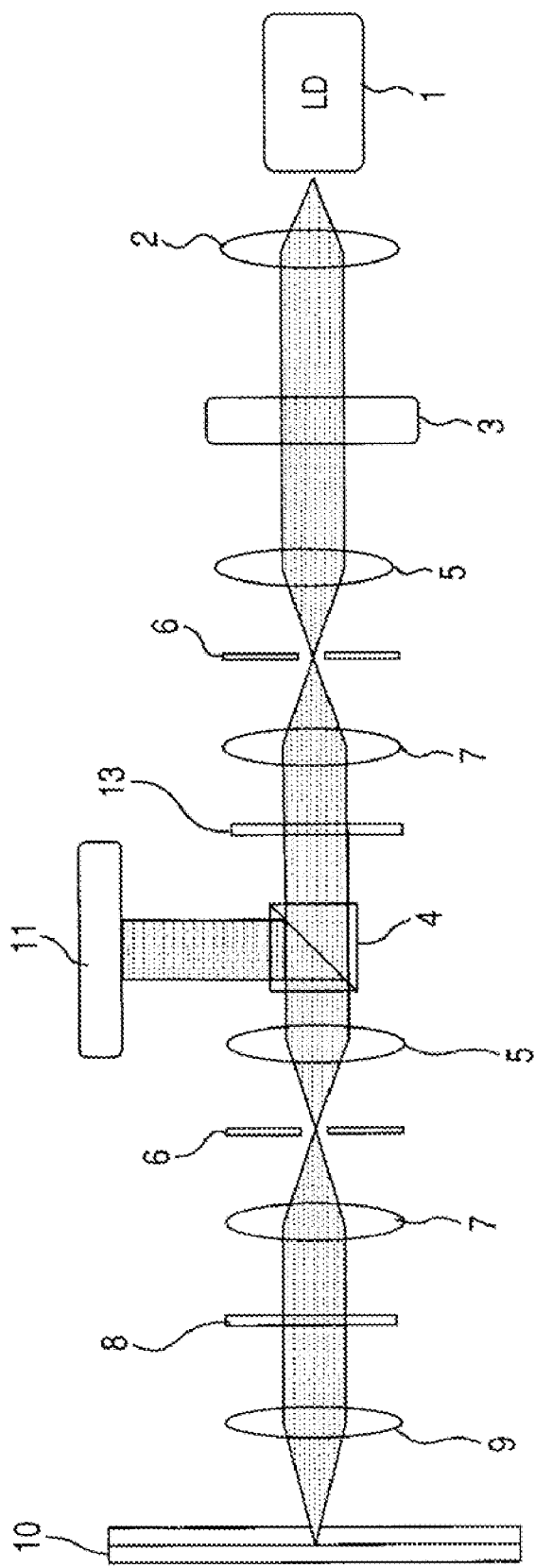
FIG. 5 is a diagram showing an example of the internal structure of a recording and reproducing apparatus including a phase mask.

FIG. 5 shows an example of the structure of a recording and reproducing apparatus employing a phase mask. In FIG. 5, components already explained with reference to FIG. 1 are denoted by the identical reference numerals and signs and explanation of the components is omitted.

The phase mask should be provided to give phase modulation in on a real image surface in an optical path. In the example shown in FIG. 5, another set of the relay lens 5, the shielding mask 6, and the relay lens 7 provided in this way are added between the SLM 3 and the polarization beam splitter 4 in the structure shown in FIG. 1 and, then, a phase mask 13 is inserted in a real image surface between the relay lens 7 and the polarization beam splitter 4 added.

Figure 6:
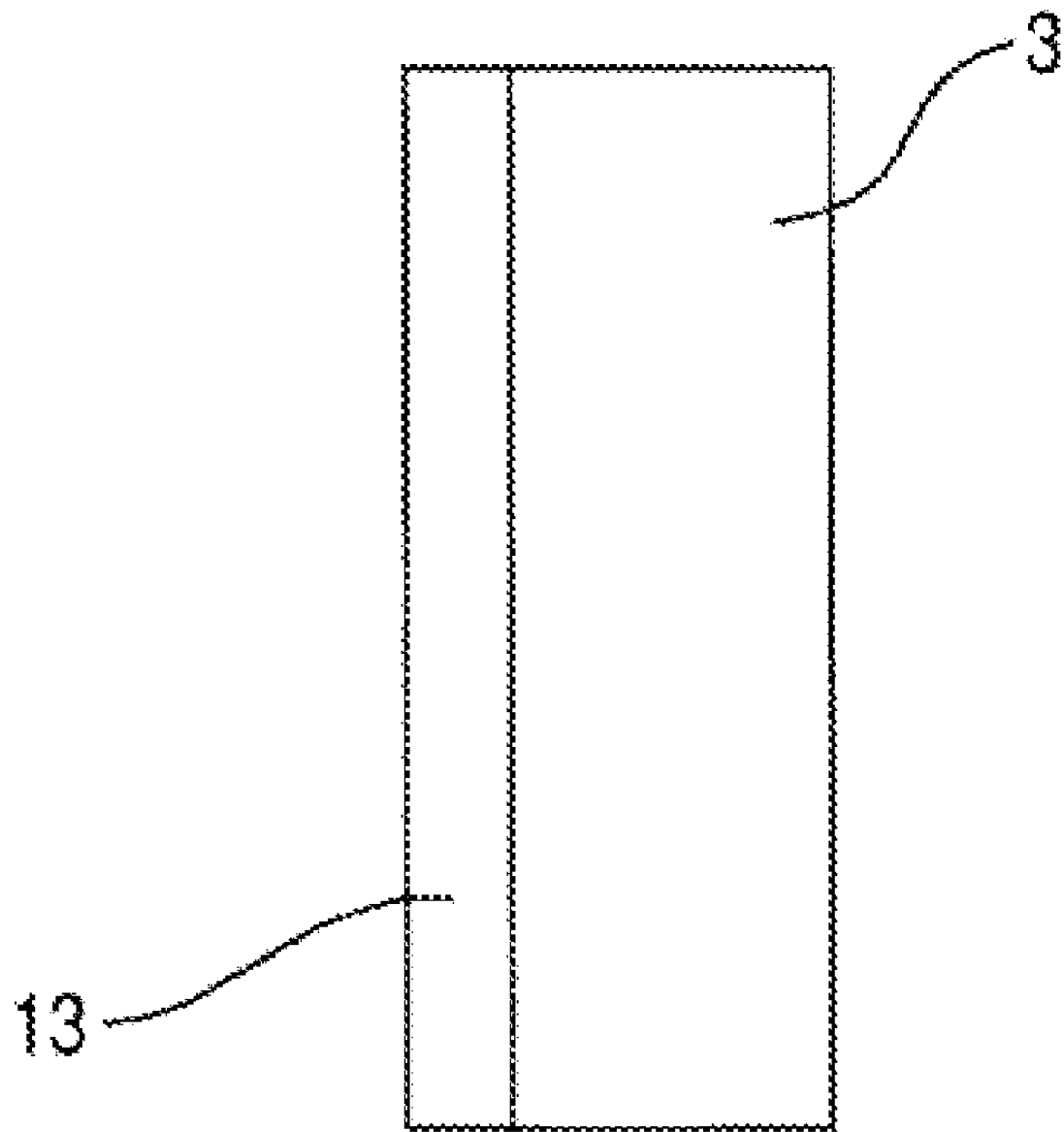
FIG. 6 is a diagram showing the structure in which the phase mask and a spatial light modulator are integrally formed.

Alternatively, as shown in FIG. 6, the phase mask 13 can be provided to be formed integrally with the SLM 3. In other words, since a portion where emitted light from the SLM 3 can be obtained corresponds to the real image surface, the phase mask 13 is integrally formed with a light emission surface side in the SLM 3.

Phase modulation by such a phase mask 13 is applied to incident light in pixel units. Specifically, for example, a random phase modulation pattern set to include equal numbers of pixels for which a phase is modulated by "π" and pixels for which phase modulation is not performed (i.e., phase is 0) is set.

As a specific example of the structure of the phase mask 13 that makes it possible to perform random phase modulation in pixel units, a phase mask with thickness varied in pixel units is generally known. For example, there is known a phase mask in which an optical material such as glass is used and pixels with a phase "0" and pixels for which modulation with a phase "π" is performed are set according to an optical length difference due to a difference in thickness of the optical material.

Specifically, in giving phase modulation with the phase "π", when a wavelength of incident light is represented as "λ" and a refractive index of a member in use is represented as "n", a difference "t" in the thickness of the member only has to be set to $t=\lambda/\{2(n-1)\}$.

According to the insertion of the phase mask 13, during recording, it is possible to give random phase modulation of "0" and "π" to signal light in pixel units.

The phase "0" corresponds to amplitude "1" and the phase "π" corresponds to amplitude "−1". In this case, the amplitude "1" of the phase "0" is defined as a reference phase. In the following explanation, the phase "0", the phase "π", and the like indicate phase differences from this reference phase. "Phase difference from a reproduced image" indicates a phase difference from a reproduction image with the amplitude "1" of the phase "0" as the reference phase.

Since phase modulation by a binary random pattern is given to signal light, it is possible to realize improvement of interference efficiency between reference light and signal light. At the same time, it is possible to uniformly spread spectra on a Fourier surface (an image on a medium). By setting the number of "1"s and the number of "−1" substantially the same, it is possible to realize suppression of DC component in the signal light.

Figure 7A:
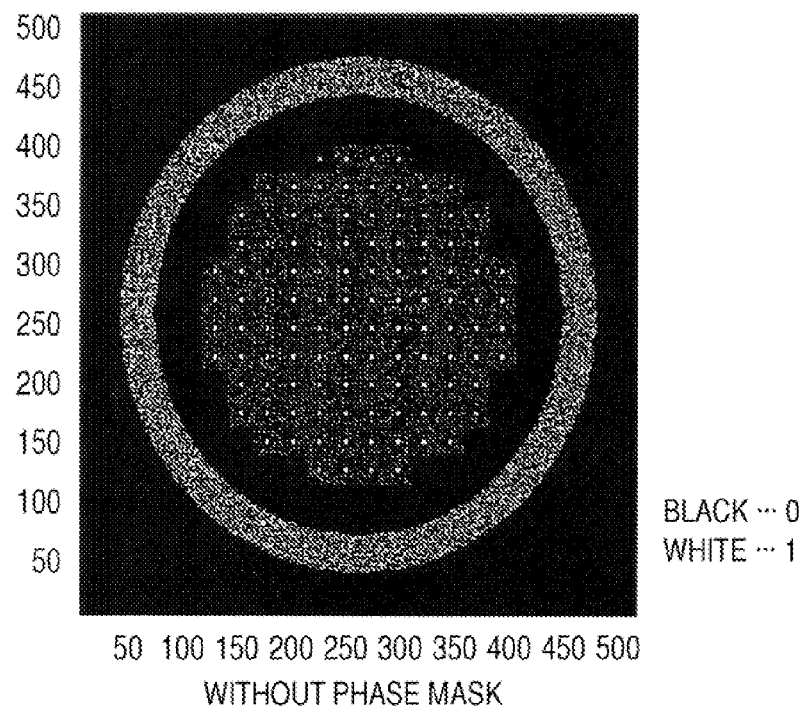
FIGS. 7A and 7B are diagrams for explaining that DC components are suppressed by phase modulation by the phase mask.
Figure 7B:
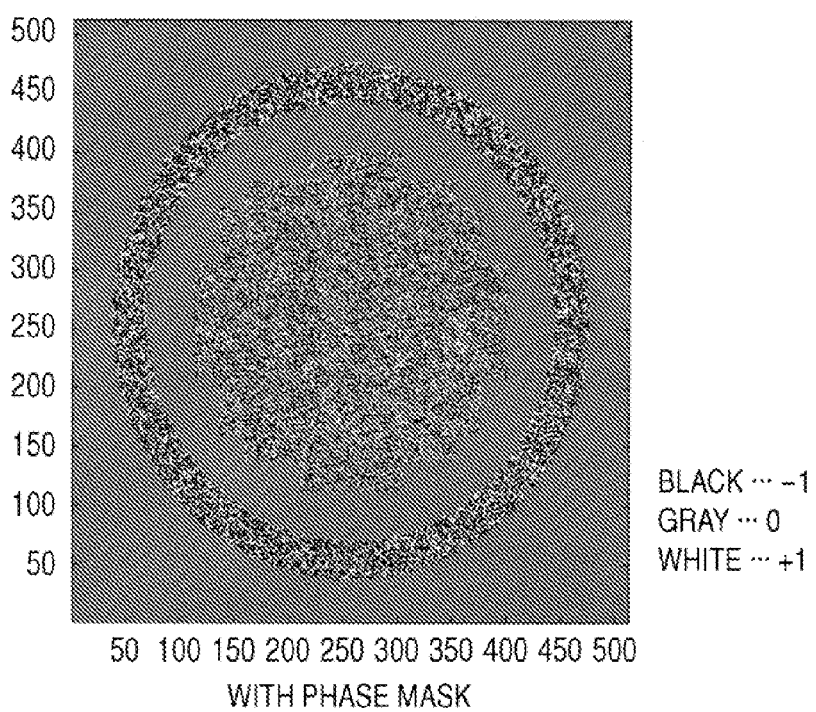

FIGS. 7A and 7B are diagrams for explaining that suppression of DC components is realized by phase modulation by the phase mask 13.

First, as a comparison, in FIG. 7A, signal light and reference light obtained during recording when a phase mask is not provided are schematically shown. In this figure, light intensity is indicated by light and shade of colors. Light intensity increases from a dark color to white. Specifically, in this case, black indicates that light intensity is low (data "0") and white indicates that light intensity is high (data "1").

It is seen from FIG. 7A that, when the phase mask 13 is not provided, only a pattern of "0" and "1" corresponding to recorded data is simply given to the signal light. As described above, DC components are generated in proportion to the number of "1"s.

According to this figure, it is seen that necessary data pattern of "0" and "1" is given to the reference light as well.

FIG. 7B schematically shows signal light and reference light obtained during recording with a phase mask. In this figure, as in FIG. 7A, light intensity increases from a dark color to white. However, in this case, black indicates "−1", gray indicates "0", and white indicates "+1".

Referring to FIG. 7B on this basis, it is seen that, when the phase mask 13 is provided, the signal light is modulated into "0" and "+1" and also modulated to "−1". Such a result "−1" is obtained because pixels with data "1" (i.e., light intensity is high) are divided into pixels with the phase "0" and pixels with the phase "π" according to random phase modulation with "0" and "1" of the phase mask 13 described above. In other words, for the data "1", a result "+1" is obtained when modulation is not performed (phase "0") and a result "−1" is obtained when modulation with the phase "π" is performed. For confirmation, since transmitted light from the SLM 3 is not obtained for data "0", a result of phase modulation with "0" and "π" by the phase mask 13 does not change from "0".

According to FIG. 7B, it is indicated that, in this case, phase modulation with the phases "0" and "π" is applied to the reference light as well and three values "0", "+1", and "−1" are obtained.

Since the data "1" is divided into "+1" and "−1" according to random phase modulation with "0" and "π" in the signal light in this way, it is possible to uniformly spread spectra on a medium. Moreover, it is possible to realize suppression of DC components in the signal light by substantially matching the number of "+1"s and the number of "−1". It is possible to perform multiple recording of hologram pages and realize an increase in a recording capacity.

Figure 8A:
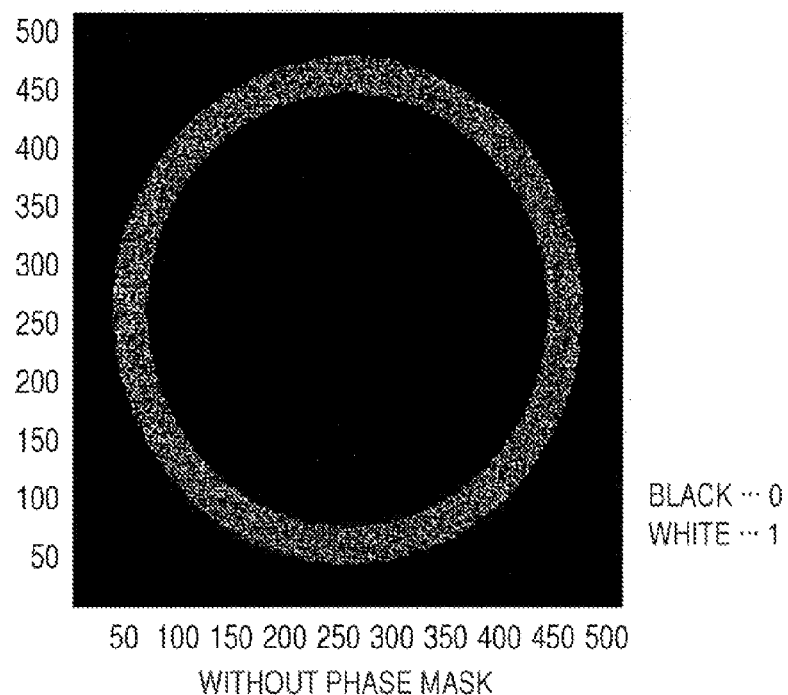
FIGS. 8A and 8B are diagrams schematically showing reference light during reproduction with the phase mask provided.
Figure 8B:
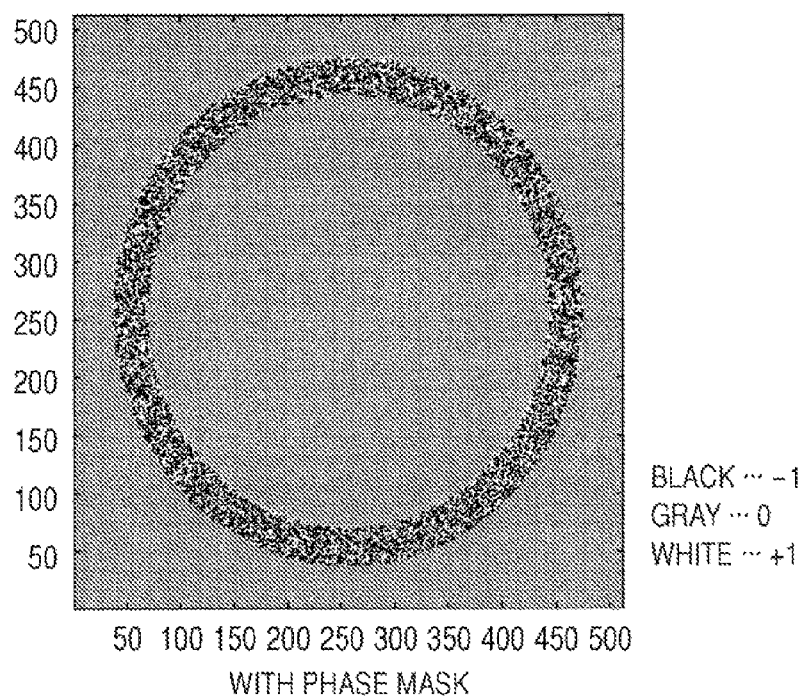

In FIGS. 8A and 8B, reference light during reproduction with the phase mask 13 is schematically shown. In FIG. 8A, as comparison, reference light during reproduction without a phase mask is shown. The reference light during reproduction without a phase mask is the same as that during recording without a phase mask shown in FIG. 7A. In other words, in this case, as in the case described above, a predetermined data pattern of "0" and "1" is given to the reference light by the SLM 3.

Reference light during reproduction with a phase mask shown in FIG. 8B is the same as that during recording with a phase mask shown in FIG. 7B. In other words, in this case, as in the case described above, a predetermined data pattern of "0" and "1" is given to the reference light by the SLM 3 and phase modulation by the same phase mask 13 is performed, a result same as that in the case of FIG. 7B is obtained.

What is important here is that, when phase modulation in pixel units is performed as in the phase mask 13, phase modulation patterns during recording and during reproduction have to coincide with each other. In other words, data recorded by using reference light having a certain phase modulation pattern during recording can only be reproduced by using reference light having a pattern same as the phase modulation pattern (including a pattern with phases "0" and "π" of light-intensity ON pixels interchanged) during reproduction. In view of this point, when phase modulation in pixel units is performed for suppression of DC components, a phase modulation pattern of the reference light has to be set to the same pattern during recording and during reproduction.

In the structure explained with reference to FIG. 5 above, light irradiation on the hologram recording medium 10 is performed via the phase mask 13 that is common during recording and reproduction. Therefore, it is possible apply phase modulation with the same pattern to the reference light during recording and during reproduction.

2. Recording and Reproduction According to Embodiments

2-1. First Embodiment

As it is understood from the fact that a spectrum spread effect by the phase mask 13 is obtained as described above, it is possible to record information on phases together with information on light intensity (also referred to as amplitude) on the hologram recording medium. In other words, information on phases with "0" and "π" can be recorded together with information on amplitudes of "0" and "1" in such a manner as "−1", "0", and "1" described above.

If information on arbitrary phases such as "0" and "π" can be recorded other than information on amplitudes in this way, it is conceivable to increase a recordable data capacity by performing record modulation and encoding with the amplitudes and the phases combined.

However, even if larger amount of data can be recorded by performing record modulation and encoding with the amplitudes and the phases combined in this way, in the hologram recording and reproducing system, information on intensity of a reproduced image can only be detected by the image sensor 11. Therefore, as a result, it is difficult to reproduce the recorded information on phases and properly perform data reproduction.

In general, an optical system employing the hologram recording and reproducing system including the optical system of the recording and reproducing apparatus shown in FIG. 1 has the structure based on a 4f optical system in which an SLM, an object lens, a medium, an eyepiece, and an image sensor are arranged focal lengths of the lenses apart from one another, respectively. This is the structure called a Fourier transform hologram.

In such structure of the Fourier transform hologram, the series of operations of recording and reproduction explained above can be regarded as described below.

A recorded data pattern of the SLM is subjected to Fourier transform and projected on the hologram recording medium (the medium). A readout signal (a reproduced image) of the medium is subjected to inverse Fourier transform and projected on the image sensor. The image sensor detects intensity of light that is the square of an absolute value of amplitude of a wave surface of light inputted thereto.

In this way, in the hologram recording and reproducing system, it is possible to reproduce only information on intensity of light that can be represented as a square value of amplitude of a signal recorded in the medium. In other words, the hologram recording and reproducing system has nonlinearity in that, whereas both amplitudes and phases can be recorded, only information on the amplitudes can be reproduced on a reproduction side.

Because of such a problem of nonlinearity of the hologram recording and reproducing system, ternary or more values are not recorded at a time by combining amplitudes and phases.

Therefore, in this embodiment, linear readout that makes it possible to read out information on phases together with information on amplitudes recorded on the hologram recording medium is realized. This makes it possible to record and reproduce symbols of ternary or more values by a combination of amplitudes and phases from recording and reproduction by binary values "0" and "1" in the past and realize further increase in a data recording capacity than in the past.

Figure 9:
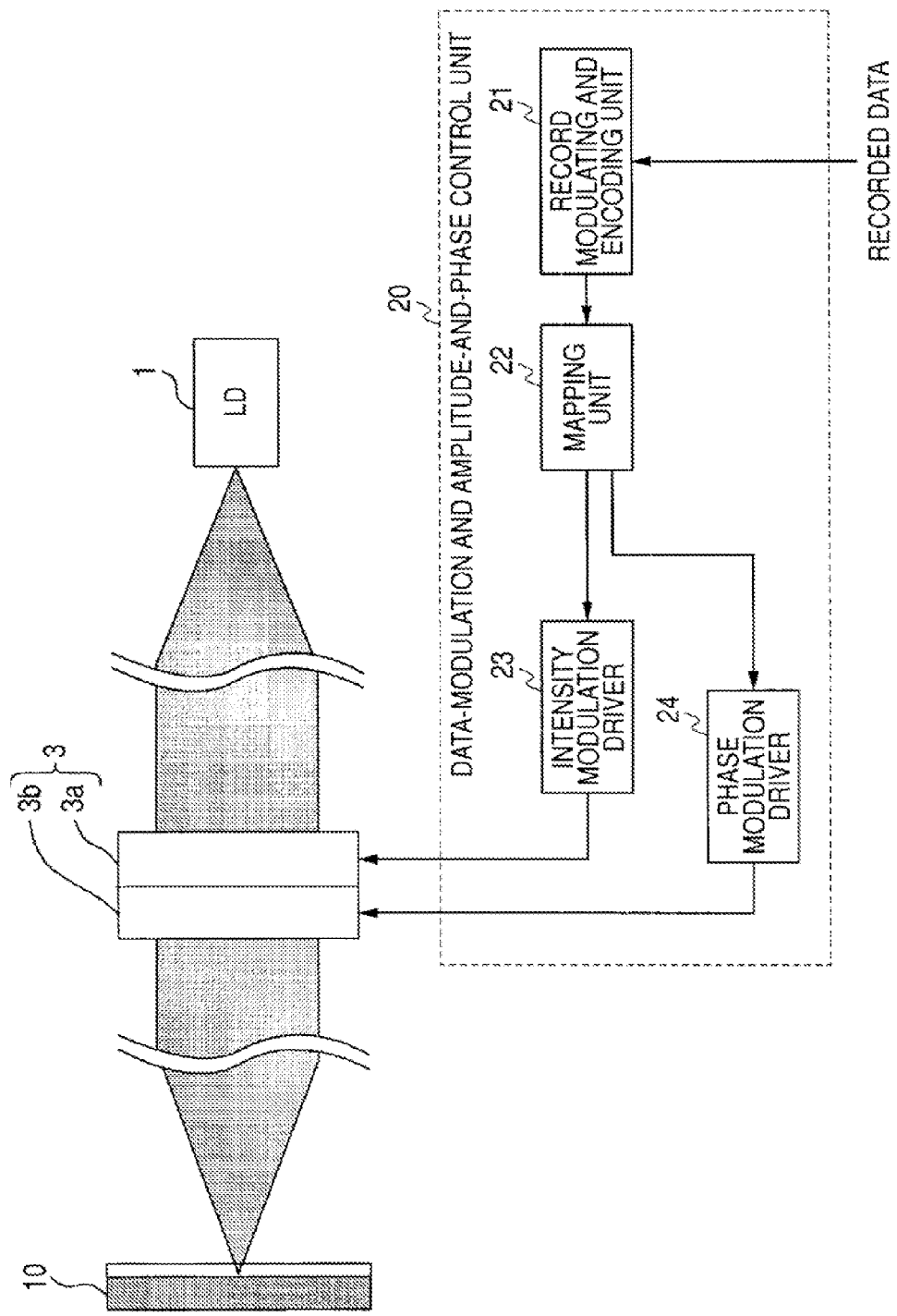
FIG. 9 is a diagram for explaining the structure for realizing recording and reproducing operations according to a first embodiment and showing the structure of a spatial-light modulating unit used in the embodiment and the internal structure of a data-modulation and amplitude-and-phase control unit for driving to control the spatial-light modulating unit.

FIG. 9 is a diagram for explaining the structure for realizing recording and reproducing operations according to the first embodiment and shows the structure of the SLM 3 used in this embodiment and the internal structure of the data-modulation and amplitude-and-phase control unit 20 for controlling to drive the SLM 3.

In this figure, only the laser diode 1 and the SLM 3 are shown among the components of the recording and reproducing apparatus shown in FIG. 1 and the other components are not shown. In this figure, the hologram recording medium 10 set in the recording and reproducing apparatus is shown and light emitted from the laser diode 1 and guided to the SLM 3 and light transmitted through the SLM 3 and guided to the hologram recording medium 10 are also shown. First, the structure of the SLM 3 shown in FIG. 9 is explained.

As shown in the figure, the SLM 3 in this case has an intensity modulator 3*a* as a section that performs light intensity modulation for generation of signal light and reference light and also has a phase modulator 3*b* that applies optical phase modulation to the signal light and the reference light generated by the intensity modulator 3*a*.

The intensity modulator 3*a* is a section that realizes a light intensity modulation function of the SLM 3 explained with reference to FIG. 1. The intensity modulator 3*a* includes a transmissive liquid crystal panel and changes transmittance of each of pixels according to driving signals from a driving circuit (an intensity modulation driver 23) described later. Therefore, the intensity modulator 3*a* applies light intensity modulation corresponding to a level of the driving signal to incident light.

As the phase modulator 3*b*, a transmissive liquid crystal panel that can perform phase modulation variable in pixel units is used.

Figure 10A:
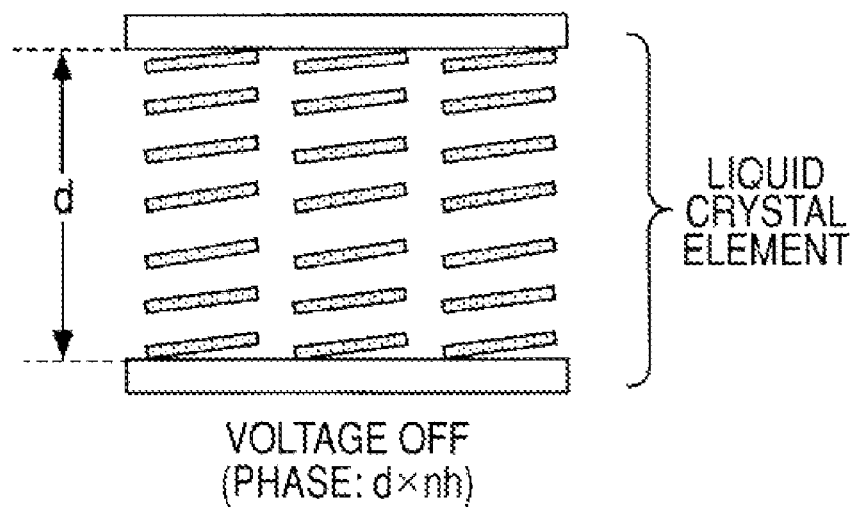
FIGS. 10A and 10B are diagrams for explaining the structure of a liquid crystal element that is capable of performing phase modulation in pixel units.
Figure 10B:
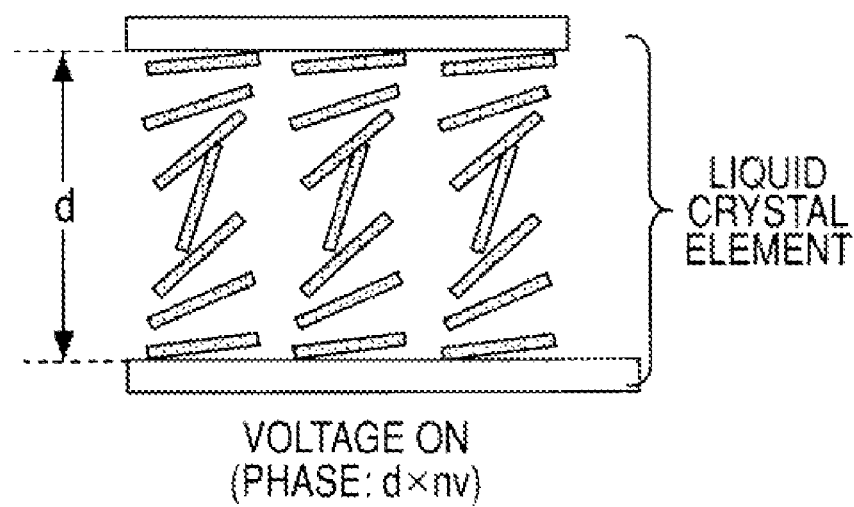

The liquid crystal panel that can perform phase modulation in pixel units can be realized by configuring a liquid crystal element in the liquid crystal panel on the basis of an idea indicated by FIGS. 10A and 10B.

In FIG. 10A, a state of liquid crystal molecules in a state in which a driving voltage is not applied to the liquid crystal element in the liquid crystal panel (i.e., a state of driving voltage OFF) is shown. In FIG. 10B, a state of liquid crystal molecules in a state in which a driving voltage at a predetermined level is applied to the liquid crystal element (a state of driving voltage ON) is shown.

As shown in the figure, in the state of driving voltage OFF shown in FIG. 10A, the liquid crystal molecules are in horizontal orientation. In the state of driving voltage ON shown in FIG. 10B, the liquid crystal molecules are changed to vertical orientation.

In this case, with respect to a refractive index "n" of the liquid crystal element, a refractive index during the horizontal orientation by driving voltage OFF is represented as nh and a refractive index during the vertical orientation by driving voltage ON at the predetermined level is represented as nv. Then, when the thickness of the liquid crystal element is represented as "d", a phase change amount given during driving voltage OFF is "d×nh" and a phase change amount given during driving voltage ON is "d×nv". Therefore, a phase difference Δnd that can be given by ON/OFF of the driving voltage is represented as Δnd=d×nh−d×nv.

It, is seen from this relational expression that, in giving a necessary phase difference in pixel units, the thickness "d" of the liquid crystal element only has to be adjusted.

The phase modulator 3b used in this method is set to have, for example, a phase difference of Δnd=2π by adjusting the thickness "d" of the liquid crystal element. Moreover, it is possible to change a phase stepwise from "0" to "2π" by controlling a driving voltage level stepwise to the predetermined level. Consequently, it is possible to apply optical phase modulation by a binary value "0" to each of the pixels by giving the OFF driving voltage thereto and apply optical phase modulation by a binary value "3π/2" to each of the pixels by giving the ON driving voltage of 3/4 at the predetermined level thereto.

Similarly, if a driving voltage level is set to 2/4 of the predetermined level, modulation by a phase "π" is also possible. If a driving voltage level is set to 1/4 of the predetermined level, modulation by a phase "π/2" is also possible.

Referring back to FIG. 9, in the SLM 3, the phase modulator 3b that is capable of performing variable phase modulation for each of the pixels in this way is integrally formed with the intensity modulator 3a. In other words, respective pixels of the intensity modulator 3a and the phase modulator 3b are positioned to correspond to each other in a one-to-one positional relation and the intensity modulator 3a and the phase modulator 3b are integrally formed.

With such structure, it is possible to apply optical phase modulation, with phase modulation patterns strictly matched in pixel units, to each of lights that should be signal light and reference light obtained through the intensity modulator 3a.

The data-modulation and amplitude-and-phase control unit 20 shown in FIG. 9 is configured to control a modulation operation of each of the intensity modulator 3a and the phase modulator 3b in such an SLM 3.

As shown in the figure, a record modulating and encoding unit 21, a mapping unit 22, an intensity modulation driver 23, and a phase modulation driver 24 are provided in the data-modulation and amplitude-and-phase control unit 20.

[Operation During Recording]

First, an operation during recording is explained.

During recording, recorded data is inputted to the record modulating and encoding unit 21 as shown in the figure. The record modulating and encoding unit 21 applies predetermine record modulation and encoding processing according to a recording format decided in advance to the recorded data. In this embodiment, an inputted recorded data sequence formed by a combination of two kinds of values "0" and "1" is converted into a data sequence formed by a combination of three kinds of values.

FIGS. 11A and 11B are diagrams for explaining the recording and reproducing method according to the first embodiment and show an example of the record modulation and encoding.

First, in FIG. 11A, concerning binary data of "0" and "1" (recorded data inputted to the encoding unit 21), combinations of the recorded data with 4 bits set as 1 symbol are shown. When the binary data is formed by 4 bits 1 symbol, there are sixteen combinations of the binary data. In other words, sixteen data patterns are possible.

On the other hand, in FIG. 11B, DC free combinations in 4 bit 1 symbol in using ternary values "−1", "0", and "1" realized by combinations of amplitudes "0" and "1" and phases "0" and "π" are shown. For confirmation, "DC free" in this case means that the number of "1"s and the number of "−1"s are equal.

In this way, there are nineteen combinations including "0,0,0,0" as DC free combinations among ternary 4-bit combinations. If sixteen data patterns among the nineteen ternary 4-bit combinations are used, it is possible to allocate the data patterns to all binary 4-bit combinations shown in FIG. 11A. Specifically, record modulation and encoding/decoding in this case only has to be applied to, for example, each of the sixteen binary 4-bit data patterns shown in FIG. 11A by using a conversion table to which each of the sixteen data patterns among the nineteen ternary 4-bit DC free combinations shown in FIG. 11B is allocated (associated).

For example, if record modulation and encoding are performed by using such a conversion table and ternary recording by "−1", "0", and "1" on the hologram recording medium 10 is performed, as in the case in which the phase mask 13 is used, it is possible to perform data recording to realize suppression of DC components.

For simplification of explanation, as an example in taking into account suppression of DC components, 1 symbol on the binary side and 1 symbol on the ternary side coincide with each other at 4 bits and an encoding ratio is set to 100%. However, for example, in realizing an increase in a recording capacity while realizing suppression of DC components, the number of symbols on the ternary side only has to be further increased.

When 4 bits are set as 1 symbols as shown in FIG. 11B, to equalize the number of "1"s and the number of "−1"s taking into account DC free, there are only two combinations (excluding All "0"), i.e. the number of "1"s and "−1"s is two or the number of "1"s and "−1"s is one and the number of "0"s is two. On the other hand, if the number of bits is further increased, it is possible to increase combinations of "1", "−1", and "0" for equalizing the numbers of "1"s and "−1"s. It is possible to set a tendency of further improving a rate of increase of combinations for DC free.

Specifically, in this case, it is possible to increase an encoding ratio to exceed 100% by setting 1 symbol on the ternary side to be equal to or larger than 7 bits.

When 1 symbol is set as 7 bits, as combinations for equalizing the numbers of "1"s and "−1"s, there are three combinations in total, i.e., one "1" and "−1" and five "0"s, two "1"s and "−1"s and three "0"s, and three "1"s and "−1"s and one "0" (excluding All "0"). As combinations of one "1" and "−1" among 7 bits, there are 7C2=7*6/2/1=21 combinations. As combinations of "1" and "−1", there are 2C1=2 combinations. Therefore, as DC free combinations in the case of one "1" and "−1" and five "0"s, there are 7C2*2C1=42 combinations.

Similarly, as DC free combinations in the case of two "1"s and "−1"s and three "0"s, there are 7C4*4C2=(7*6*5*4/4/3/2/1)*(4*3/2/1)=210 combinations. Moreover, as DC free components in the case of three "1"s and "−1"s and one "0", there are 7C6*6C3=7C1*6C3=7*(6*5*4/3/2/1)=140 combinations.

Therefore, as DC free combinations in the case of 1 symbol 7 bits, there are 42+210+140=392 combinations. In the case of a binary value, there are $2^8$=256 combinations of data patterns in the case of 1 symbol 8 bits. Therefore, since 392>256, if 1 symbol is 7 bits on the ternary side, the combinations can be DC free and an encoding ratio can be increased to exceed 100%. Specifically, if each of binary 8-bit data patterns is allocated according to 256 data patterns among 392 ternary 7-bit data patterns, it is possible to increase a data recording capacity by 8/7 fold while realizing suppression of DC components.

Naturally, when combinations are not DC free, it is evident that the number of ternary 4-bit combinations is overwhelmingly large. In that case, it is possible to realize a further increase in a recording capacity.

Referring back to FIG. 9, the record modulating and encoding unit 21 described above converts 1 symbol of inputted recorded data (binary values "0" and "1") into symbols of ternary values "−1", "0", and "1" in accordance with a rule of record modulation and encoding decided in advance. Although not shown in the figure, in the record modulating and encoding unit 21, a conversion table associating each of data patterns that can be generated when a predetermined number of bits of binary data is set to 1 symbol shown in FIG. 11A and each of DC free data patterns in setting the predetermined number of bits of ternary data to 1 symbol shown in FIG. 11B is stored. Data patterns for 1 symbol of inputted recorded data are converted into data patterns according to the predetermined number of ternary bits in accordance with the conversion table. Consequently, record modulation and encoding from a binary value to a ternary value is performed.

For simplification of explanation, 4 bits are 1 symbol. However, actually, to realize DC free as well as an increase in a recording capacity, for example, 8 bits or more are set to 1 symbol on the binary side and 7 bits or more are set to 1 symbol on the ternary side.

Ternary symbols obtained as such a result of record modulation and encoding performed by the record modulating and encoding unit 21 are sequentially supplied to the mapping unit 22.

The mapping unit 22 maps ternary symbols ("−1", "0", and "1"), which are supplied from the record modulating and encoding unit 21, to one hologram page. Specifically, the mapping unit 22 arrays each of the ternary symbols supplied from the record modulating and encoding unit 21 to allocate the ternary symbol to each of the pixels in the signal light area A2.

The hologram page indicates an entire data array laid in the signal light area A2. In other words, a data unit that can be recorded at a time in interference between signal light and reference light is referred to as hologram page.

Then, the record modulating and encoding unit 21 generates, together with a data pattern in the signal light area A2 obtained by such a mapping, a data pattern in which the reference light area A1 is a predetermined pattern of "0" and "1" and all the other areas are "0". The record modulating and encoding unit 21 combines the data patterns to generate a data pattern for all effective pixels of the SLM 3.

The mapping unit 22 controls, on the basis of the data pattern for all the effective pixels of the SLM 3 obtained in this way, output voltages by the intensity modulation driver 23 and the phase modulation driver 24. Specifically, concerning pixels to which "0" is mapped, in order to set both amplitude and a phase to "0", the mapping unit 22 indicates a value for setting the output voltages to "0" to the intensity modulation driver 23 and the phase modulation driver 24. Concerning pixels to which "1" is mapped, in order to set amplitude to "1" and set a phase to "0", the mapping unit 22 indicates a value for setting the output voltage to a value corresponding to "1" to the intensity modulation driver 23 and indicates a value for setting the output voltage to "0" to the phase modulation driver 24. Moreover, concerning pixels to which "−1" is mapped, in order to set amplitude to "1" and set a phase to "π", the mapping unit 22 indicates a value for setting the output voltage to a value corresponding to "1" to the intensity modulation driver 23 and indicates a value for setting the output voltage to "1/2" to the phase modulation driver 24.

In this case, for example, if gradation is 256, values of 0 to 255 are indicated to the intensity modulation driver 23 and the phase modulation driver 24 as values "0" to "1". The intensity modulation driver 23 and the phase modulation driver 24 are configured to drive each of pixels of the intensity modulator 3a and the phase modulator 3b according to driving voltage levels corresponding to the values indicated by the mapping unit 22 in this way.

Therefore, since the control by the mapping unit 22 described above is performed, signal light in which "−1", "0", and "1" are arrayed is outputted from the SLM 3 together with reference light during recording. Consequently, it is possible to record the ternary values "−1", "0", and "1" on the hologram recording medium 10.

Phase modulation for the reference light area A1 is not specifically explained above. However, phase modulation according to a predetermined pattern decided in advance only has to be applied to the reference light area A1.

For confirmation, during recording, the mapping unit 22 sequentially performs mapping for each of hologram pages concerning data encoded by the record modulating and encoding unit 21. Consequently, a data pattern in which only a data pattern in the signal light area A2 sequentially changes according to recorded data content is supplied to the intensity modulation driver 23. The intensity modulation driver 23 sequentially controls to drive each of the pixels of the intensity modulator 3a on the basis of such a data pattern in each hologram page unit.

Consequently, it is possible to record data on the hologram recording medium 10 in each hologram page unit.

As described above, in this embodiment, record modulation and encoding for converting the recorded data of the binary values "0" and "1" into a ternary symbol obtained by combining three kinds of values "0", "1", and "−1" is performed and, then, a value of each of the ternary symbols according to a combination of amplitude and a phase. In this way, it is possible to record information with the number of bits smaller than that in controlling only ON and OFF of amplitude according to a data sequence formed by a combination of two kinds of values and recording the values as in the past. Consequently, it is possible to realize an increase in a data recording capacity.

As described above, it is also possible to realize suppression of DC components by allocating only a combination of equal numbers of "−1" and "1" as a ternary data pattern. Moreover, in this case, it is possible to realize an increase in a recording capacity while realizing suppression of DC components by performing record modulation encoding with 1 symbol on the ternary side set to be equal to or larger than 7 bits in association with 1 symbol on the binary side set to be equal to or larger than 8 bits.

[Readout by Differential Detection]

During recording, it is possible to record ternary symbols on the hologram recording medium 10 as combination of amplitudes and phases and realize an increase in a data recording capacity by performing record modulation and encoding and amplitude and phase control described above. However, unless signals recorded in this way can be properly reproduced, a recording and reproducing system is not established. In other words, ternary recording and reproduction is not established unless linear readout for reading out information on phases together with recorded information on amplitude is realized.

In this embodiment, a method by differential detection is proposed as a method for making it possible to perform such linear readout. Specifically, the differential detection is a method of adding two DC lights (lights set to have uniform amplitude and phase) in a relation in which phases thereof are inverted with respect to a reproduced image corresponding to data recorded on the hologram recording medium 10, which is obtained by irradiating reference light during reproduction, to perform readout and calculating a difference between results of the readout.

Figure 12:
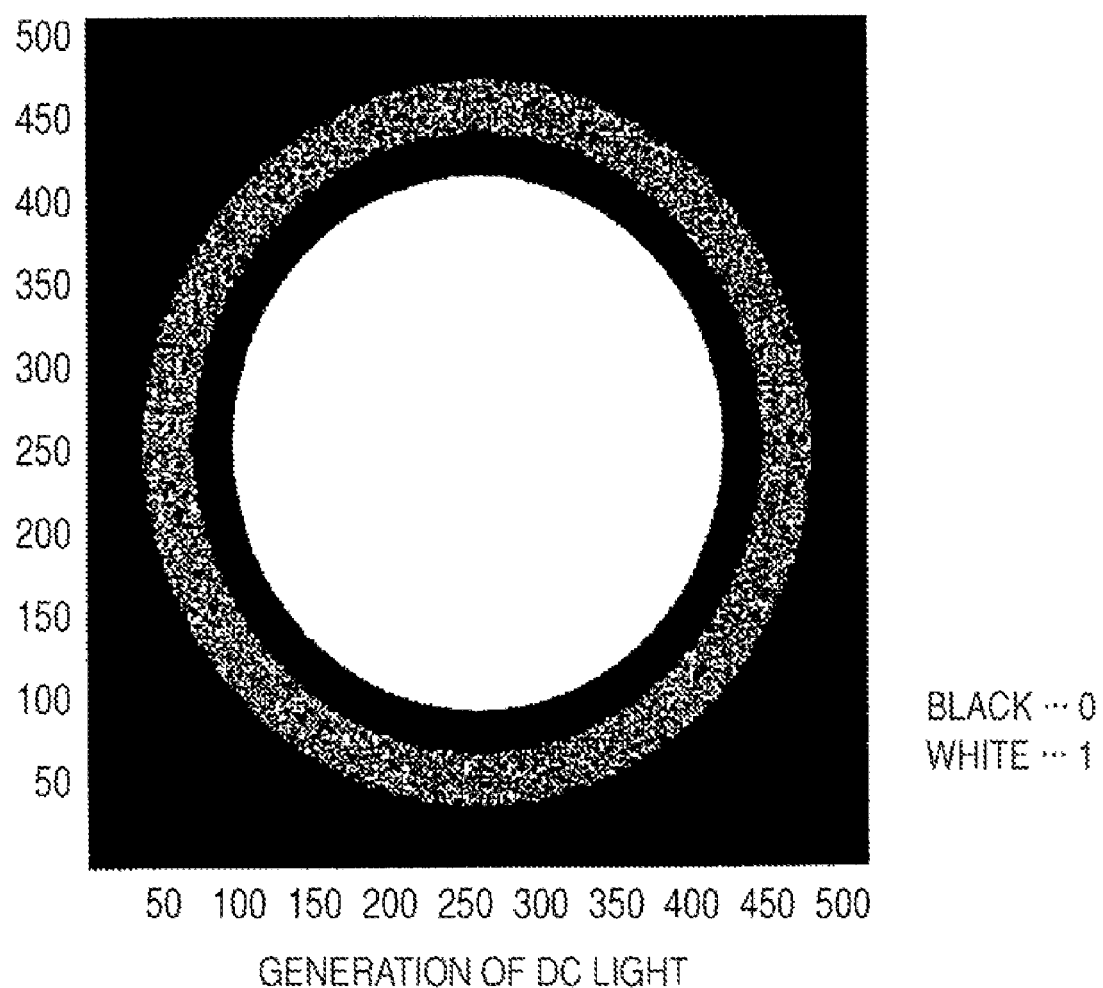
FIG. 12 is a diagram for explaining generation of DC light and schematically showing an intensity modulation pattern in an intensity modulator.

FIG. 12 is a diagram for explaining generation of the DC light that should be irradiated in performing such differential detection and schematically shows an intensity modulation pattern in the SLM 3 (the intensity modulator 3a). In this figure, as explained above, black indicates "0" and white indicates "1" as light intensity.

As shown in FIG. 12, the DC light is generated by transmitting light through the signal light area A2 as well.

Two DC light in a relation in which phases are inverted as described above are generated by further applying phase modulation to the light transmitted through the signal light area A2. As the differential detection, in reading out one hologram page, the two DC lights generated in this way are sequentially irradiated on the hologram recording medium 10 together with the reference light, reproduced images to which the two DC lights are added, respectively, are sequentially read out, and a difference between two readout signals of the reproduced images are calculated to perform data reproduction.

In the case of the first embodiment, as the two DC lights in the relation in which phases thereof are inverted as described above, DC lights, phase differences of which with respect to a reproduced image obtained according to irradiation of reference light are "0" (0 degree) and "π" (180 degrees), respectively, are irradiated. Realization of linear readout by differential detection performed by using the two DC lights, phase differences of which with respect to a reproduced image are "0" and "π", respectively, is explained below.

Figure 13A:
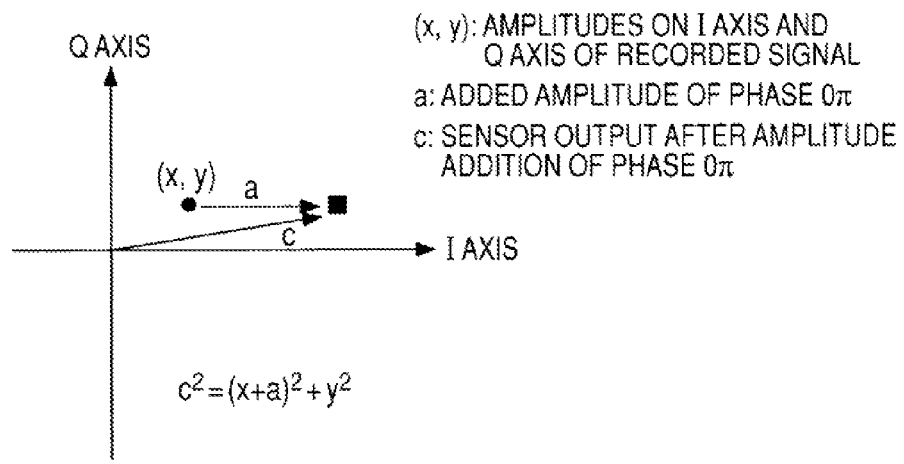
FIGS. 13A and 13B are diagrams for explaining a principle of differential detection and representing, with a signal point with respect to an I axis and a Q axis as references, a signal recorded as a combination of certain amplitude and an arbitrary phase on a hologram recording medium.
Figure 13B:
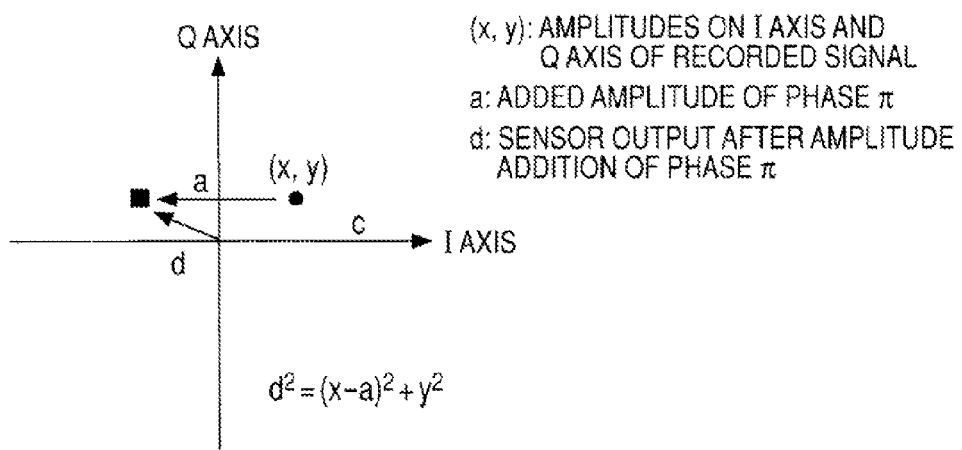

FIGS. 13A and 13B are diagrams for explaining a principle of the differential detection and represent a signal recorded as a combination of certain amplitude and an arbitrary phase on the hologram recording medium 10 with a signal point with respect to an I axis (In-phase) and a Q (Quadrature) axis. FIG. 13A shows a case in which amplitude "a" of a phase "0" is added to a recorded signal. FIG. 13B shows a case in which amplitude "a" of a phase "π" is added to a recorded signal.

First, in respective figures in FIGS. 13A and 13B, the I axis and the Q axis only have to be considered the same as those used in explanation of a principle of multi-value modulation and demodulation such as PSK (Phase Shift Keying) and QAM (Quadrature Amplitude Modulation), for example, in the field of communication. The I axis represents a phase "0" and a phase "π" (i.e., a phase 0 degree and a phase 180 degrees) and the Q axis represents a phase "π/2" and a phase "3π/2" (i.e., a phase 90 degrees and a phase 270 degrees).

When such I axis and Q axis are set as references, a signal recorded as a combination of amplitude and a phase on the hologram recording medium 10 can be represented by a coordinate (x, y) shown in the figure, where amplitude in an I axis direction is "x" and amplitude in a Q axis direction is "y".

Naturally, a reproduced image obtained by irradiating reference light reflects a value of the signal recorded on the hologram recording medium 10. On this basis, addition of the DC lights (e.g., light intensity is "a") with the phase difference 0 and the phase difference π described above to the reproduced image is equivalent to addition of the amplitude "a" of the phase "0" and the amplitude "a" of the phase "π" to the recorded signal (x, y) indicated with respect to the I axis and the Q axis as shown in each of FIGS. 13A and 13B.

In this case, when it is assumed that a coordinate representing a detected output value (a value of a sensor output) by the image sensor 11 concerning a signal as a combination of the amplitude "0" and the phase "0" is the origin (0, 0), a value of a sensor output concerning a signal recorded as a combination of certain amplitude and an arbitrary phase is represented as a distance from a position of the recorded signal to the origin.

Consequently, a value of a sensor output at the time when the amplitude "a" of the phase "0" is added shown in FIG. 13A is represented by "c" in the figure. A value of a sensor output at the time when the amplitude "a" of the phase "π" shown in FIG. 13B is represented by "d" in the figure.

On the basis of such a premise, (x, y), "a", "c", and "d" represent the following:

(x, y): amplitudes on the I axis and the Q axis of a recorded signal;

a: added amplitudes of the phase "0" and the phase "π";

c: a value of a sensor output after addition of amplitude of the phase "0"; and d: a value of a sensor output after addition of amplitude of the phase "π".

Then, when the amplitude "a" of the phase "0" shown in FIG. 13A is added, a relation $c^2=(x+a)^2+y^2$ holds. Similarly, when the amplitude "a" of the phase "π" shown in FIG. 13B is added, a relation $d^2=(x-a)^2+y^2$ holds.

For confirmation, respective terms are squared in the equations in order to associate the equations with the premise of the Fourier transform hologram described above, i.e., the premise that only information on light intensity as a square value of a recorded signal can be reproduced by the hologram recording and reproducing system.

As described above, as the differential detection according to this embodiment, the DC light with the phase difference "0" and the DC light with the phase difference "π" are added to a reproduced image to perform readout and a difference between two kinds of readout signals obtained as a result of the readout is calculated.

This is equivalent to calculation of a difference between $c^2$ and $d^2$ of the above equations as well as calculation of "$c^2-d^2$" by the differential detection. A result of the calculation is $c^2-d^2=\{(x+a)^2+y^2\}-\{(x-a)^2+y^2\}=4ax$.

In this way, with the differential detection according to this embodiment, only a value proportional to "x" is obtained. In other words, a value representing only a value of amplitude of the I-axis recorded on the hologram recording medium 10 is obtained.

In such differential detection, a range of a magnitude of the amplitude "a" is not specifically limited. However, as it is evident from the fact that $c^2-d^2=0$ when a=0, it is desirable that a value of the amplitude "a" is large in an allowable range.

The value proportional to "x" is obtained in this way. This means that, with the differential detection in this case, if a signal is recorded to be a signal point on the I axis, it is possible to correctly read out the signal.

According to the explanation about the operation during recording, in the case of the first embodiment, the phases "0" and "π" are combined with the amplitude "1" to perform ternary recording of "−1", "0", and "1". For confirmation, a diagram representing signal points of ternary values "−1", "0", and "1" with respect to the I axis and the Q axis as in FIGS. 13A and 13B is shown in FIG. 14.

As it is seen with reference to FIG. 14, when the respective values "−1", "0", and "1" are indicated by a signal point (x, y) with respect to the I axis and the Q axis, these values are represented as (−1, 0), (0, 0), and (1, 0). In other words, in all the values, y=0. Therefore, if only components proportional to "x" are correctly obtained by the differential detection as described above, a signal (−1, 0) recorded as a combination of the phase "π" can also be correctly read out. As a result, it is possible to correctly reproduce the respective values "−1", "0", and "1" recorded on the hologram recording medium 10 as (−1, 0), (0, 0), and (−1, 0).

[Operation During Reproduction]

The operation principle of the differential detection according to the first embodiment is explained above. An operation during reproduction actually performed on the basis of such a principle is as described below.

FIG. 15 schematically shows an overview of an operation during reproduction performed in the recording and reproducing apparatus according to the first embodiment.

First, as an example, in a first time, a reproduced image and DC light, a phase difference of which from the reproduced image is "0", is irradiated on the hologram recording medium 10 and, in a second time, a reproduced image and DC light, a phase difference of which from the reproduced image is "π", is irradiated on the hologram recording medium 10.

In this case, a phase of reference light is "0" in irradiation of both the first time and the second time as shown in the figure.

On such a premise, during irradiation in the first time, phase modulation by "π/2" is given to the DC light as shown in the figure. During irradiation in the second time, phase modulation by "3π/2" is given to the DC light.

Since the phase of the reference light is "0" as described above, it may be assumed that a phase of a reproduced image obtained by the irradiation is "0". In other words, judging from this assumption, it is anticipated that it is difficult to obtain, in the setting of the phases of the DC lights described above, relations between phases of the reproduced image and the DC lights in the first time and second time.

However, in the hologram recording and reproducing system, as described in Kogelnik, H "Coupled wave theory for thick hologramgrating". Bell System Technical Journal, 48, 2909-47, a predetermined phase difference occurs between a phase of a reproduced image and a phase of reference light irradiated for obtaining the reproduced image. Specifically, it is known that the phase of the reproduced image shifts by "π/2" with respect to the phase of the reference light.

The phases of the DC lights in the first time and second time are set taking into account such a phase difference of "π/2".

When the reference light and the DC lights are sequentially irradiated on the hologram recording medium 10 by the settings in the first time and the second time, a first image signal based on "a reproduced image and DC light, a phase difference of which from the reproduced image is "0"" and a second image signal based on "a reproduced image and DC light, a phase difference of which from the reproduced image is "π"" are sequentially outputted from the image sensor 11.

A value of 4ax explained above is obtained by calculating a difference between the first image signal and the second image signal as shown in the figure. Consequently, the differential detection is realized.

[Apparatus Structure for Realizing a Reproducing Operation According to the First Embodiment]

The structure of the recording and reproducing apparatus according to the first embodiment for realizing a reproducing operation by such differential detection is explained below.

First, an operation for generating reference light and DC light during reproduction described above is performed on the basis of control by the data-modulation and amplitude-and-phase control unit 20 shown in FIG. 9.

In FIG. 9, the mapping unit 22 performs control described below during reproduction.

First, the mapping unit 22 generates a data pattern for generation of reference light and DC light. Specifically, with the reference light area A1 set as a pattern of "0" and "1" same as that during recording and the entire area further on the outer peripheral side than the gap area A3 and the reference light area A1 set as "0", the mapping unit 22 further generates a data pattern in which the signal light area A2 is set to a predetermined value other than "0". The mapping unit 22 supplies this data pattern to the intensity modulation driver 23.

As described above, the intensity modulator 3a changes transmittance according to a driving voltage level of each of the pixels. In other words, rather than setting transmittance to binary values "0" and "1", it is possible to variably change transmittance, for example, from "0" to "1".

In response to the change in transmittance, the intensity modulation driver 23 drives relevant pixels at a driving voltage level for maximizing light intensity according to "1" (e.g., a value corresponding to "255" if gradation is 256) supplied from the mapping unit 22. The intensity modulation driver 23 drives relevant pixels at a driving voltage level for minimizing light intensity according to "0". When the predetermined value other than "0" is allocated as a data pattern in the signal light area A2 from the mapping unit 22 as described above, the intensity modulation driver 23 drives respective pixels in the signal light area A2 of the intensity modulator 3a according to a driving voltage corresponding to the value. In other words, DC light according to intensity corresponding to the value allocated in the signal light area A2 by the mapping unit 22 is obtained in this way.

The mapping unit 22 applies, every time one hologram page is read out, control to the phase modulator 3b described below to set phases of reference light and DC lights in the first time and the second time explained with reference to FIG. 15.

First, in this case, a phase modulation pattern for the reference light area A1 is the same as that during recording in both the first time and the second time.

Then, as control in the first time, concerning the signal light area A2, the mapping unit 22 generates a data pattern with the entire area filled with "1/4", combines the data pattern and the phase modulation pattern (data pattern) of the reference light area A1 to generate a data pattern for all effective pixels of the phase modulator 3b, and supplies the data pattern to the phase modulation driver 24.

As control in the second time following the control in the first time, while keeping the pattern same as that in the first time for the reference light area A1, the mapping unit 22 generates a data pattern for all effective pixels of the phase modulator 3b with the entire signal light area A2 changed to "3/4" and supplies the data pattern to the phase modulation driver 24.

As described above, the phase modulation driver 24 drives relevant pixels of the phase modulator 3b according to driving voltages corresponding to values "0" to "1" (e.g., 0 to 255 in 256 gradation) indicated by the mapping unit 22. In this case, the phase modulator 3b can perform phase modulation from "0" to "2π" according to driving voltages corresponding to values "0" to "1". Therefore, in the first time when the signal light area A2 is filled with "1/4" as described above, a phase of the DC light is modulated to "π/2". In the second time when the signal light area A2 is filled with "3/4", a phase of the DC light is modulated to "3π/2".

Since amplitude and phase control is performed every time one hologram page is read out by the data-modulation and amplitude-and-phase control unit 20 in this way, phase and amplitude control for the reference light and the DC lights in the first time and the second time shown in FIG. 15 is realized. Consequently, during reproduction, every time one hologram page is read out, DC lights, phase differences of which between reference light by an intensity and phase pattern same as that during recording and a reproduced image obtained from the hologram recording medium 10 according to irradiation of the reference light are "0" and "π", respectively, are irradiated.

A data reproducing unit 30 that calculates a difference between two kinds of image signals obtained according to irradiation of such reference light and two kinds of DC light and performs reproduction signal processing for obtaining final reproduced data from a result of the calculation is explained.

Figure 16:
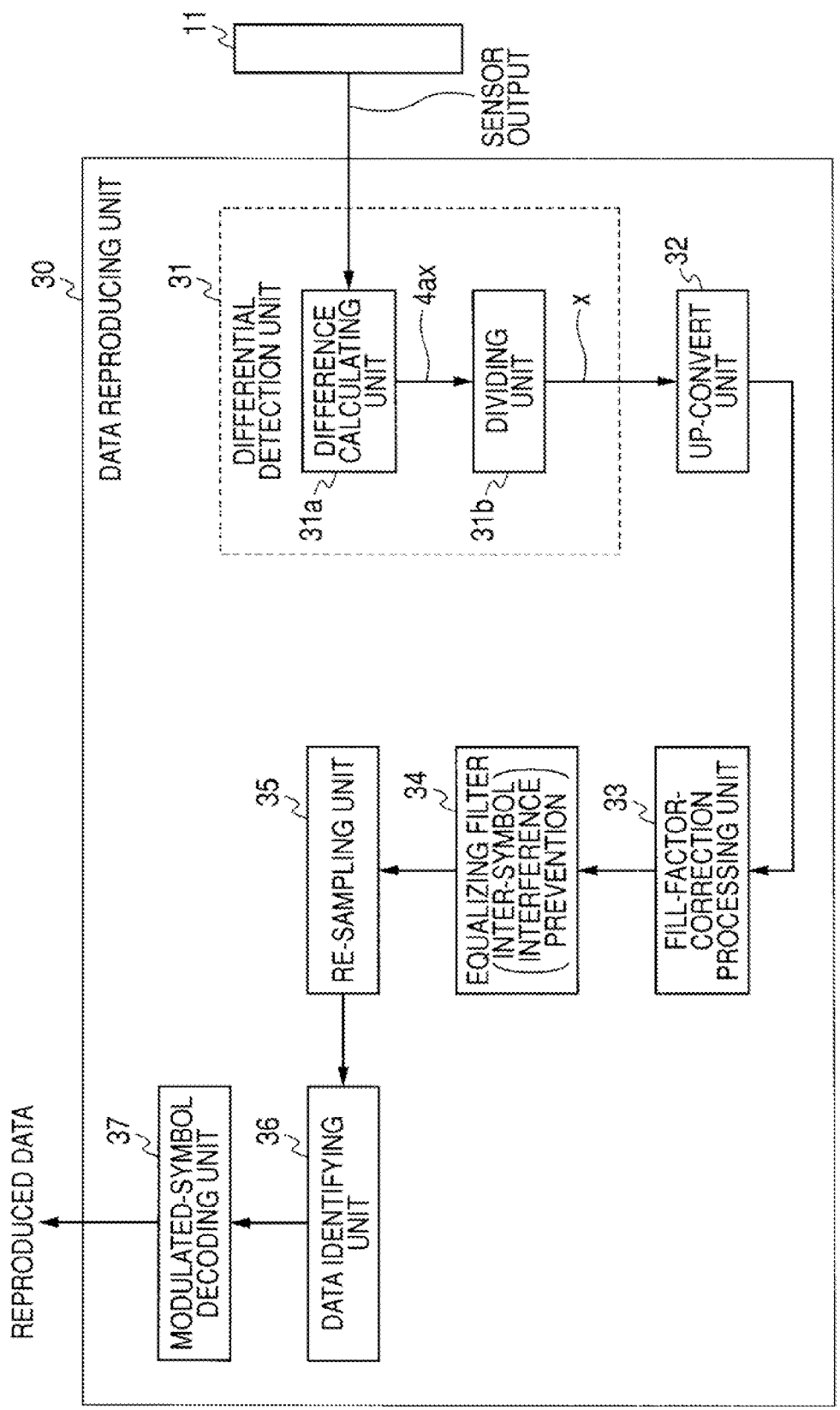
FIG. 16 is a diagram showing only the structure of an image sensor and a data reproducing unit extracted from the structure of the recording and reproducing apparatus according to the first embodiment.

FIG. 16 shows the internal structure of the data reproducing unit 30 provided in the recording and reproducing apparatus according to the first embodiment. In this figure, only the image sensor 11 is extracted from the structure of the optical system included in the recording and reproducing apparatus and shown. Since the other components are the same as those shown in FIG. 1, the components are not shown in the figure.

In FIG. 16, according to irradiation of the reference light and the two kinds of DC light by the operation during reproduction of the data-modulation and amplitude-and-phase control unit 20, for each hologram page, a set of a reproduced image and DC light, a phase difference of which from the reproduced image is "0", and a set of a reproduced image and DC light, a phase difference of which from the reproduced image is "π", are received on the image sensor 11. In this case, the DC lights are coherent lights in which amplitudes and phases are uniform. Therefore, the DC lights do not interfere with data recorded on the hologram recording medium 10. The DC lights after irradiation on the hologram recording medium 10 are added as coherent lights to which, when reproduced images obtained according to irradiation of the reference light are focused on the image sensor 11, predetermined phase differences (in this case, "0" and "π") with respect to the reproduced images are given. Consequently, it is possible to uniformly add necessary amplitude values (in this case, "a" and "−a") to the reproduced images.

Therefore, in the image sensor 11, every time one hologram page is read out, a light reception result (a first image signal) concerning light obtained by adding DC light, a phase difference of which from a reproduced image is "0", to the reproduced image and a light reception result (a second image signal) concerning light obtained by adding DC light, a phase difference of which from a reproduced image is "π", to the reproduced image are obtained.

The data reproducing unit 30 shown in FIG. 16 sequentially inputs the first image signal and the second image signal obtained for each hologram page by the image sensor 11 in this way and performs signal processing for data reproduction. As shown in the figure, the data reproducing unit 30 includes a differential detection unit 31, an up-convert unit 32, a fill-factor-correction processing unit 33, an equalizing filter 34, a resampling unit 35, a data identifying unit 36, and a modulated-symbol decoding unit 37.

First, an output (a sensor output) from the image sensor 11 is inputted to the differential detection unit 31. A difference calculating unit 31a and a dividing unit 31b are provided in the differential detection unit 31.

The difference calculating unit 31a is inputted with the first image signal and the second image signal obtained every time on hologram page is read out as described above and obtains an image signal as a difference between the first image signal and the second image signal. Specifically, when a value of the first image signal is represented as $c^2$ and a value of the second image signal is represented as $d^2$, the difference calculating unit 31a performs difference calculation represented by $c^2-d^2$ to obtain an image signal represented by a value of 4ax explained above.

The dividing unit 31b divides the entire image signal (4ax), which is obtained by the difference calculating unit 31a in this way, by a value of 4a to obtain an image signal represented by a value of "x".

Although not shown in the figure, a value as the amplitude "a" set as intensity of DC light in the data-modulation and amplitude-and-phase control unit 20 is stored in the dividing unit 31b. The dividing unit 31b performs the division using this value of "a".

According to the operation of the differential detection unit 31, it is possible to obtain image signals properly corresponding to the recorded three kinds of values "−1", "0", and "1". In other words, a linear readout signal in which information on the phase "π" is read out together with the amplitudes "0" and "1" is obtained.

What should be noted here is that, even if such a linear readout signal is obtained, recorded data itself is not reproduced. This is because the image sensor 11 represents intensity of detected light with an amplitude value by predetermined gradation such as 256 gradation and, therefore, the linear readout signal obtained by the differential detection unit 31 also represents such an amplitude value of predetermined gradation. Processing from data identification for bits "−1", "0", and "1" based on such an amplitude value represented by predetermined gradation to final reproduction of recorded data (original binary data) from the identified bits is performed by the units from the up-convert unit 32 to the modulated-symbol decoding unit 37 shown in FIG. 16.

The reproduced signal processing systems provided at a post stage of such a difference detection unit 31 are specifically described below.

First, in understanding operations of these reproduced signal processing systems, the following point needs to be grasped. The point is that, in the hologram recording and reproducing system, it is important to perform positioning for specifying which pixel in the SLM 3 each of pixels on the image sensor 11 corresponds to.

In the hologram recording and reproducing system, because of problems such as optical distortion and a magnification, it is extremely difficult to strictly match respective pixels (hereinafter also referred to as data pixels) on the spatial light modulating unit (SLM) 3 side and respective pixels (hereinafter also referred to as detector pixels) on the image sensor 11 side in a one-to-one relation. Therefore, to cope with such deviation, it is specified (searched) in which positions in an image signal obtained by the image sensor 11 data pixels of the SLM 3 are located. Then, a procedure for obtaining amplitude values of the positions of the data pixels specified as a result of this search and identifying a bit value of each of the data pixels from the amplitude values is taken.

Although explanation with reference to the figure is omitted here, in order to make it possible to cope with the deviation of the reproduced image due to the optical distortion, a magnification, and the like, the image sensor 11 is adjusted in advance to receive an image for one pixel on the SLM 3 side in "n" pixels (n>1) on the image sensor 11 side (so-called over-sampling). For example, the image sensor 11 receives a reproduced image for one pixel of the SLM 3 in 2×2=4 pixels on the image sensor 11. Such over-sampling is performed in order to increase resolution on a detected image side such that, even when the deviation of the reproduced image described above occurs in units smaller than the pixels, it is possible to cope with the deviation.

For example, when an over-sampling rate is set to 2×2=4 times as in the example described above, an image signal having resolution four times as high as that on the SLM 3 side is outputted from the image sensor 11. In response to the output of the image signal, as a readout signal (an image signal) from the differential detection unit 31, a signal having this four-times resolution is obtained.

In FIG. 16, the readout signal obtained by the differential detection unit 31 in this way is supplied to the up-convert unit 32 as shown in the figure.

The up-convert unit 32 up-converts the readout signal to a predetermined magnification by applying, for example, interpolation processing to the readout signal.

By further applying up-convert processing to the image after over-sampling in this way, it is possible to further increase resolution and more highly accurately perform positioning corresponding to irradiation position deviation of a reproduced image.

The image signal after the up-convert by the up-convert unit 32 is supplied to the fill-factor-correction processing unit 33. In the fill-factor-correction processing unit 33, correction processing corresponding to a fill factor of the SLM 3 and a fill factor of the image sensor 11 is performed. In the signal after readout by the image sensor 11, a high-frequency portion is deteriorated by influence of the fill factor of the SLM 3 and the fill factor of the image sensor 11. Therefore, as specific processing, correction processing for highlighting the deteriorated high-frequency portion is executed.

The equalizing filter 34 is inputted with the image signal after the correction processing by the fill-factor-correction processing unit 33 and performs wave-form equalization processing for prevention of inter-symbol interference. As equalization processing for prevention of inter-symbol interference performed by the equalizing filter 34, processing executed by expanding waveform equalization processing for a one-dimensional signal, which is frequently used even in the fields of optical disks, communication, and the like, to two dimensions only has to be used.

The re-sampling unit 35 specifies positions of respective data pixels of the SLM 3 in the image signal after the equalization processing by the equalizing filter 34 and acquires amplitude values of the specified respective data pixels (this is referred to as re-sampling).

In specifying positions of the respective data pixels in the image signal, as a general method performed in the past, predetermined pattern data called "sync" is inserted in recorded data. In that case, the re-sampling unit 35 searches for a sync portion as the predetermined pattern from the image signal and specifies positions of the respective data pixels from a position of the sync detected as a result of the search.

Such a method of specifying positions of the respective data pixels is not directly related to a readout operation by the method according to this embodiment. Therefore, detailed explanation of the method is omitted. As the method, a method considered optimum as appropriate such as a method proposed in the past or a method proposed in future only has to be adopted. The method should not be specifically limited here.

After the positions of the respective data pixels are specified in this way, processing for acquiring amplitude values of the data pixels is performed. For example, in the past, interpolation processing is performed from values around the specified positions of the respective data pixels to acquire amplitude values of the data pixels by performing calculation. This is a general method in the field of image processing. A bi-linear interpolation method, a cubic convolution method, a bicubic spline method, and the like are known.

There is also a nearest neighbor method for selecting a signal value having timing closest from a specified position of a data pixel as an amplitude value of the data pixel without performing calculation.

Various methods can be adopted for processing for acquiring such amplitude values. A method for the processing is not specifically limited here.

The data identifying unit 36 performs data identification (bit judgment) based on the amplitude values of the respective data pixels obtained by the re-sampling unit 35 as described above. In this case, the data identifying unit 36 identifies which of the ternary values "−1", "0", and "1" the amplitude values of the respective data pixels are. A result of the data identification by the data identifying unit 36 is supplied to the modulated-symbol decoding unit 37.

The modulated-symbol decoding unit 37 decodes a data pattern of binary values "0" and "1" from the data identification result (a ternary data pattern formed by "−1", "0", and "1": in some case, an ALL "0" pattern is included) supplied from the data identifying unit 37 using a conversion table same as the conversion table stored in the record modulating and encoding unit 21 shown in FIG. 9.

Consequently, the original recorded data formed by binary values "0" and "1" is reproduced.

As described above, with the ternary recording and reproduction according to the first embodiment, as record modulation and encoding, the original data pattern of binary data of "0" and "1" is allocated to a data pattern formed by ternary values further including "−1". Therefore, it is possible to increase an encoding ratio to exceed 100% and realize an increase in a recording capacity.

Since only a combination with equal numbers of "−1" and "1" is allocated as the ternary data pattern, it is possible to realize suppression of DC components as well. Moreover, in this case, to cope with a case in which 1 symbol on the binary side is set to be equal to or larger than 8 bits, 1 symbol on the ternary side is set to be equal to or larger than 7 bits. This makes it possible to realize an increase in a recording capacity while realizing suppression of DC components.

On the reproduction side, it is possible to correctly read out a value "−1" recorded by combining the phase "π" thereto by performing the differential detection and it is possible to correctly read out recorded ternary values. In this way, information on the phase "π" can also be read out. Therefore, linear readout for reading out both amplitude and a phase is realized.

In the example explained above, as recording and reproduction according to the first embodiment, phases and amplitudes to be combined are set as amplitudes "0" and "1" and phases "0" and "π" and the three values in total "−1", "0", and "1" are recorded. However, if phases are set as "0" and "π"

and, then, three or more kinds of amplitude are combined with the phases, it is also possible to perform recording of ternary or more values. In other words, for example, if amplitude "0.5" is used in addition to the amplitudes "0" and "1", for example, it is possible to record symbols such as "−0.5" and "+0.5" as well. Consequently, it is possible to record ternary or more values and realize a further increase in a data recording capacity.

When amplitudes are further increased in this way, the number of values identified by the data identifying unit 36 only has to be increased according to the increase of amplitudes. For example, when "−0.5" and "+0.5" are also recorded as described above, values "−0.5" and "+0.5" only have to be identified as well together with the values "0", "1", and "−1".

2-2. Second Embodiment

Multi-Value Recording and Reproduction

As explained above, by performing the differential detection for adding DC lights, the phase difference of which from the reproduced image is "0", and the phase difference of which from the reproduced image is "π", to the reproduced image and calculating a difference between results of the addition of the DC lights, it is possible to correctly read out, for a recorded signal (x, y), only a component of "x", i.e., an amplitude component on the I axis. In the first embodiment, in response to the readout of the amplitude component, phases of a signal to be recorded are limited to "0" and "π" to typically set a value of "y" to "0". Consequently, since only a value of amplitude on the I axis is properly obtained as described above, it is possible to correctly read out a value of the recorded signal.

Taking into account the point that it is possible to correctly read out only the component of "x" by the differential detection for adding amplitudes in a direction parallel to the I axis direction of the phases "0" and "π" (also referred to as differential detection in the I axis direction) as described above, an assumption that, if differential detection based on the same idea is performed in the Q axis direction, the component of "x" is offset and only a component of "y" can be correctly obtained holds. In other words, an assumption that, if differential detection for adding amplitudes in a direction parallel to the Q axis direction of the phases "π/2" and "3π/2" is performed, the component of "y" can be correctly read out as a result of the differential detection holds.

In a second embodiment, such differential detection in the Q axis direction is also performed to correctly read out the component of "y" together with the component of "x" of the recorded signal and, as a result, make it possible to linearly read out a signal recorded as a combination of arbitrary amplitude and an arbitrary phase. Consequently, phases that can be combined are not limited to only "0" and "π" unlike those in the first embodiment to make it possible to record more multi-values and realize a further increase in a data recording capacity.

Figure 17A:
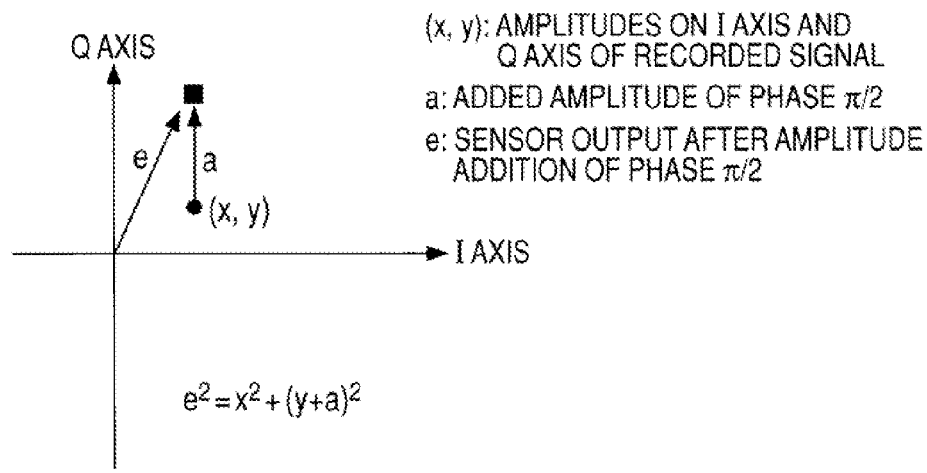
FIGS. 17A and 17B are diagrams for verifying whether differential detection holds in a Q axis direction.
Figure 17B:
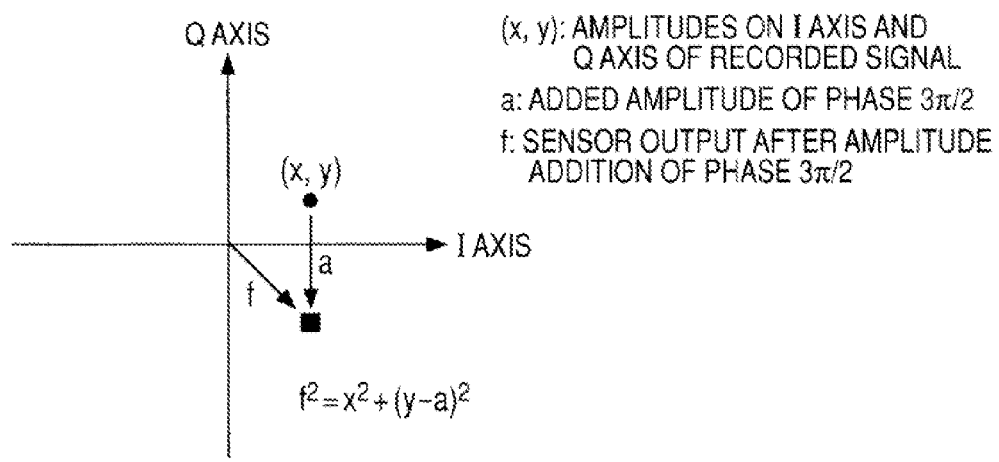

With reference to FIGS. 17A and 17B, it is verified whether the differential detection in the Q axis direction described above holds.

In FIGS. 17A and 17B, as in FIGS. 13A and 13B, a signal recorded as a combination of certain amplitude and an arbitrary phase on the hologram recording medium 10 is represented by a signal point with respect to the I axis and the Q axis.

FIG. 17A shows a case in which amplitude "a" of a phase "π/2" (90 degrees) is added to a recorded signal (i.e., DC light, a phase difference of which with respect to a reproduced image is "π/2", is added).

FIG. 17B shows a case in which amplitude "a" of a phase "3π/2" (270 degrees) is added to a recorded signal (a case in which DC light, a phase difference of which with respect to a reproduced image is "3π/2", is added).

First, in this case, as in the first embodiment, when amplitude on the I axis of a signal recorded as a combination of certain amplitude and an arbitrary phase is represented as "x" and amplitude on the Q axis of the signal is represented as y, a signal point of the signal is represented as (x, y). Then, signal points at the time when the amplitude "a" of the phase "π/2" is added and at the time when the amplitude "a" of the phase "3π/2" is added are present in positions indicated by black squares in FIGS. 17A and 17B, respectively. In this case, a sensor output obtained when the amplitude "a" of the phase "π/2" in FIG. 17A is added is represented as "e" and a sensor output obtained when the amplitude "a" of the phase 3π/2 in FIG. 17B is added is represented as "f".

In this way, (x, y), "a", "e", and "f" represent the following:
(x, y): amplitudes on the I axis and the Q axis of a recorded signal;
a: added amplitudes of the phase "π/2" and the phase "3π/2";
e: a value of a sensor output after addition of amplitude of the phase "π/2"; and
f: a value of a sensor output after addition of amplitude of the phase "3π/2".

Then, when the amplitude "a" of the phase "π/2" shown in FIG. 17A is added, a relation $e^2=x^2+(y+a)^2$ holds. Similarly, when the amplitude "a" of the phase "3π/2" shown in FIG. 17B is added, a relation $f^2=x^2+(y-a)^2$ holds.

The differential detection in the Q axis direction is equivalent to calculation of a difference between a result obtained by adding the DC light with the phase "π/2" and a result obtained by adding the amplitude of the phase "3π/2". Therefore, if the differential detection in the Q axis direction is performed, from $e^2-f^2=\{x^2+(y+a)^2\}-\{x^2+(y-a)^2\}=4ay$, it is possible to obtain only a value proportional to a value of "y". In this case, as in the first embodiment, a range of a magnitude of the amplitude "a" is not specifically limited. However, as it is evident from the fact that $e^2-f^2=0$ when a=0, it is desirable that a value of the amplitude "a" is large in an allowable range.

It is proved that, if the differential detection in the Q axis direction is performed in this way, the value of "y" can also be correctly read out. Therefore, it is possible to correctly read out not only the value of "x" of the recorded signal but also the value of "y" of the signal by performing such differential detection in the Q axis direction.

[Overview of Operations of Recording and Reproduction]

On the basis of the premise described above, multi-value recording and reproduction according to the second embodiment is explained.

First, an operation during recording is explained with reference to FIGS. 18 and 19.

Figure 18:
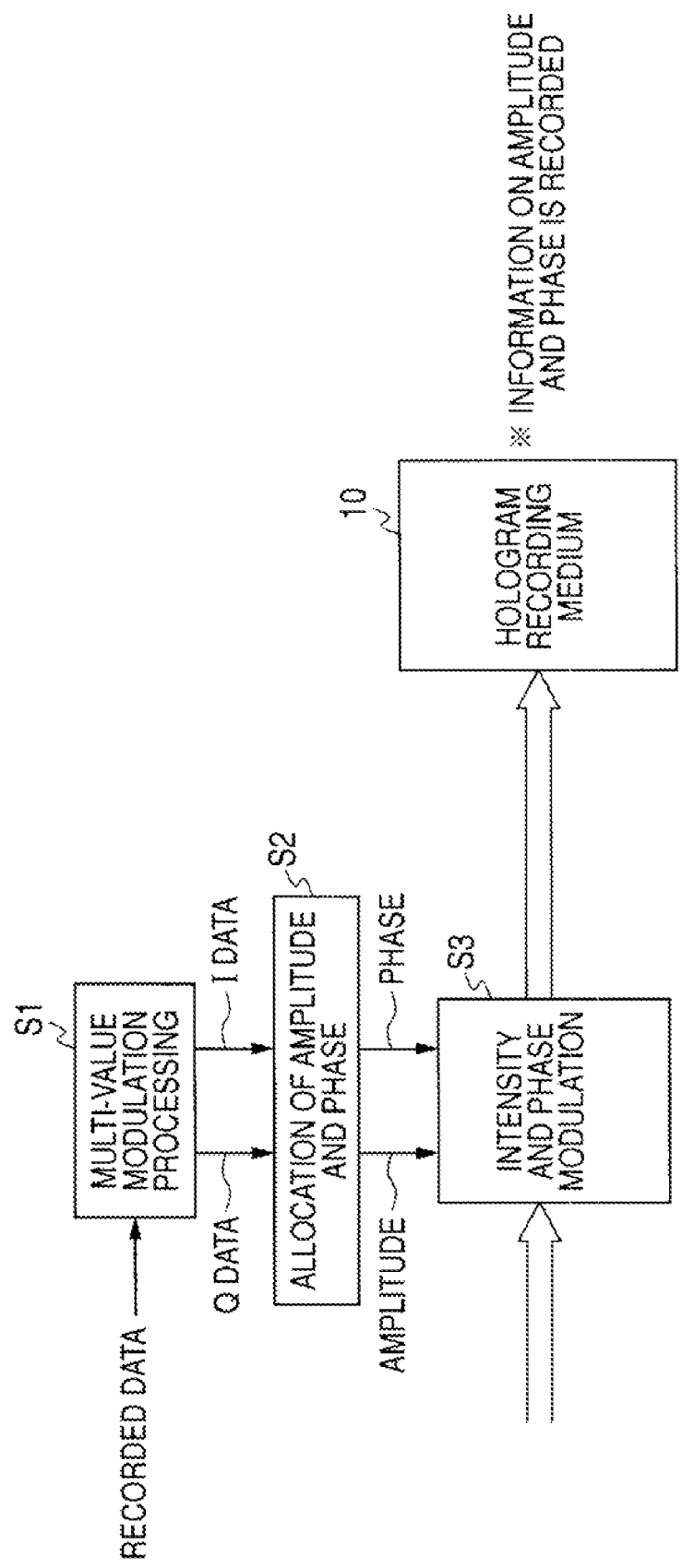
FIG. 18 is a diagram schematically showing an overview of an operation during recording according to a second embodiment.

FIG. 18 schematically shows an overview of the operation during recording.

In FIG. 18, during recording, first, in a multi-value modulation processing step S1, multi-value modulation is applied to recorded data to obtain I data and Q data.

Figure 19:
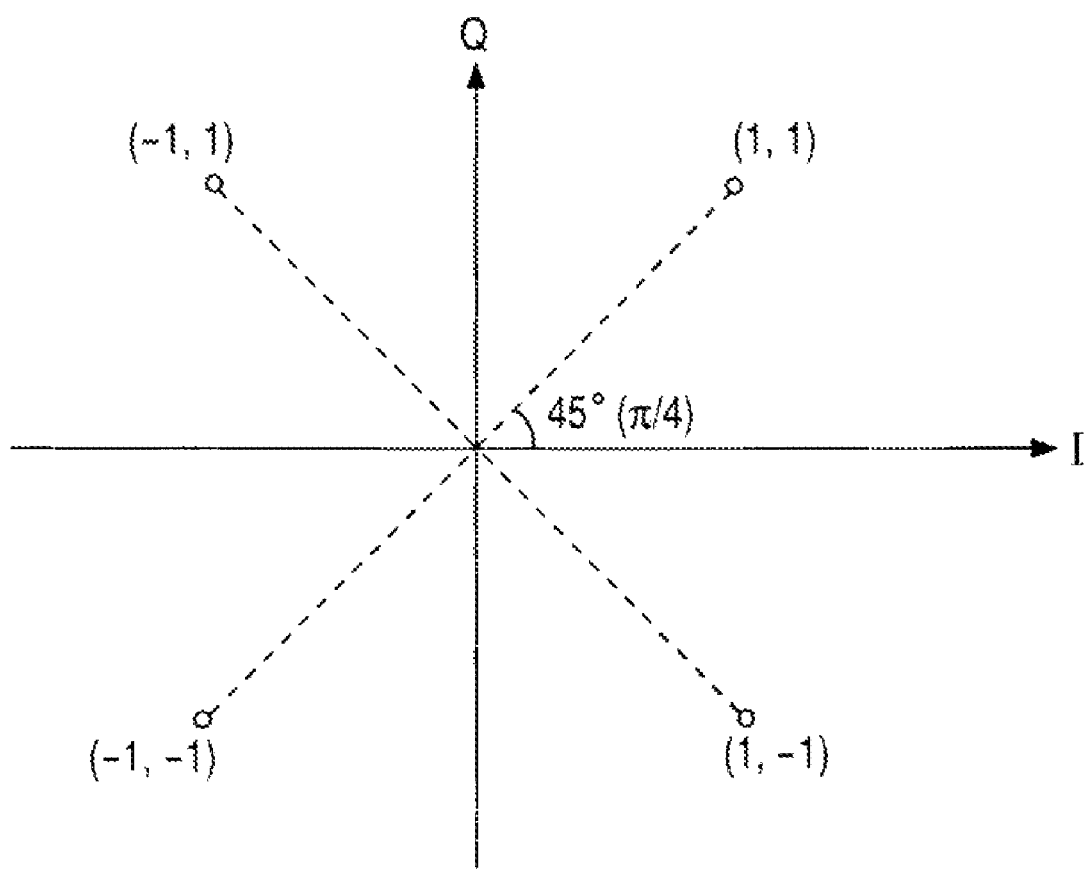
FIG. 19 is a diagram for explaining multi-value modulation in the case of the second embodiment and showing an example of a combination of I data and Q data.

FIG. 19 is a diagram for explaining the multi-value modulation in this case and shows a combination of the I data and the Q data. As shown in the figure, in the multi-value modulation in this case, when amplitude in an I axis direction is represented as "x" and amplitude in a Q axis direction is represented as "y", symbols by four combinations in total, i.e., (x, y)=(1, 1), (−1, 1), (−1, −1), and (1, −1) are used. In other words, quaternary recording is performed by using these four symbols.

Angles formed by these four signal points (1, 1), (−1, 1), (−1, −1), and (1, −1) with respect to the I axis (a phase 0 degree) are, as shown in the figure, 45 degrees (π/4), 135 degrees (3π/4), 225 degrees (5π/4), and 315 degrees (7π/4), respectively. (1, 1) is equivalent to a signal formed by a combination of predetermined amplitude and the phase "π/4" and (−1, 1) is equivalent to a signal formed by a combination of the predetermined amplitude and the phase "3π/4". Similarly, (−1, −1) is equivalent to a signal formed by a combination of the predetermined amplitude and the phase "5π/4" and (1, −1) is equivalent to a signal formed by a combination of the predetermined amplitude and the phase 7π/4.

Referring back to FIG. 18, in the multi-value modulation processing step S1, modulation encoding are performed to convert a recorded data sequence formed by a combination of inputted two kinds of values "0" and "1" into a data sequence formed by a combination of four kinds of values represented by (1, 1), (−1, 1), (−1, −1), and (1, −1) shown in FIG. 19.

For example, considering that 2 bits of recorded data formed by two values "0" and "1" are set as 1 symbol, combinations of the two values are four patterns "11", "10", "01", and "00". For example, by allocating each of the four kinds of symbols to such four sets of recorded data patterns, it is possible to represent 2 bits of the recorded data with 1 bit. In other words, an encoding ratio is 200%.

As an example, (1, 1) is allocated to the data pattern "11" of the recorded data and (−1, 1) is allocated to the data pattern "10". (−1, −1) is allocated to the data pattern "01" and (1, −1) is allocated to the data pattern "00".

As it is understood from the explanation referring to FIG. 19, these values of coordinates indicate values on the I axis and values on the Q axis, respectively. Therefore, in the multi-value modulation processing step S1, concerning these values of coordinates allocated to a binary data sequence, a value of "x" is outputted as I data and a value of "y" is outputted as Q data.

In the following amplitude and phase allocating step S2, allocation of amplitude and a phase that should be recorded on the hologram recording medium 10 is performed from the values of the I data and the Q data obtained in the multi-value modulation processing step S1. According to FIG. 19, the coordinate (1, 1), i.e., the combination of the I data ="1" and the Q data ="1" is a combination of predetermined amplitude (√2) and the phase π/4. Therefore, the predetermined amplitude and the phase π/4 are allocated to a symbol formed by such a coordinate (1, 1). Similarly, the predetermined amplitude and the phase 3π/4 are allocated to the set of the I data ="−1" and the Q data ="1" (the coordinate (−1, 1)) and the predetermined amplitude and the phase 5π/4 are allocated to the set of the I data ="−1" and the Q data ="−1" (the coordinate (−1, −1)). Moreover, the predetermined amplitude and the phase 7π/4 are allocated to the set of the I data ="1" and the Q data "−1" (the coordinate (1, −1).

In an intensity and phase modulating step S3, amplitude and phase modulation is applied to incident light and a result of the amplitude and phase modulation is irradiated on the hologram recording medium 10 such that information on the amplitudes and the phases allocated in the amplitude and phase allocating step S2 in this way is recorded. According to such an intensity and phase modulating step S3, it is possible to record quaternary values represented by the four coordinates shown in FIG. 19 on the hologram recording medium 10 with the combinations of amplitude and phases corresponding to the values, respectively. Consequently, quaternary recording is realized.

An overview of an operation during reproduction in the case of the second embodiment is explained with reference to FIG. 20.

Figure 20:
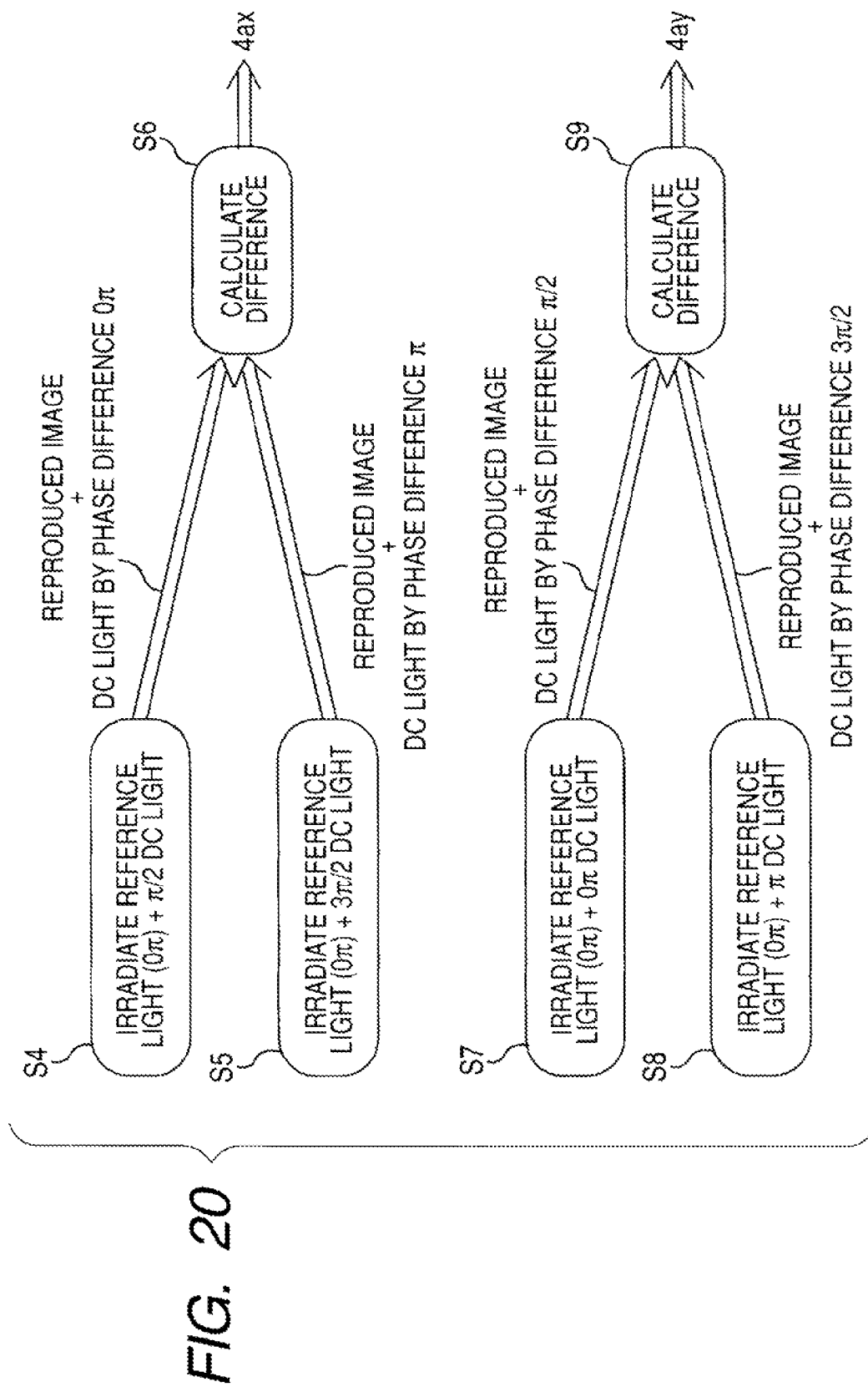
FIG. 20 is a diagram for schematically explaining an overview of an operation during reproduction according to the second embodiment.

In FIG. 20, first, in this case, during reproduction, in reading out only a component of "x" of the recorded signal, differential detection in the I axis direction same as the case of the first embodiment according to steps S4 to S6 in the figure is performed. In step S4, a reproduced image and DC light, a phase difference of which from the reproduced image is "0", are added up by irradiating reference light (a phase 0π) and DC light of a phase π/2. In step S5, a reproduced image and DC light, a phase difference of which from the reproduced image is "π", are added up by irradiating the reference light (the phase 0p) and the DC light of a phase 3π/2. Moreover, in step S6, the image signal 4ax is obtained by calculating a difference between the reproduced images and the DC lights.

In this case, in reading out one hologram page, together with the differential detection in steps S4 to S6, differential detection in the Q axis direction in steps S7 to S9 is performed. In step S7, a reproduced image and DC light, a phase difference of which from the reproduced image is "π/2", are added up by irradiating the reference light (the phase 0π) and DC light of a phase 0. In step S8, a reproduced image and DC light, a phase difference of which from the reproduced image is "3π/2", are added up by irradiating the reference light (the phase 0π) and DC light of a phase π. Then, in step S9, an image signal 4ay is obtained by calculating a difference between the reproduced images and the DC lights.

Although explanation by illustration is omitted, after the image signals 4ax and 4ay are obtained in this way, it is possible to obtain an image signal correctly representing the I data and an image signal correctly representing the Q data by dividing all the image signals by a value of 4a, respectively. If these image signals are obtained, it is possible to reproduce the original recorded data of "0" and "1" by decoding a binary data sequence in accordance with a rule of modulation encoding during recording on the basis of a combination of the I data and the Q data for each of same data pixels in those image signals.

[Structure of an Apparatus for Realizing Recording and Reproducing Operations According to the Second Embodiment]

The structure of an apparatus for realizing the method of multi-value recording and reproduction according to the second embodiment explained above is explained below.

Figure 21:
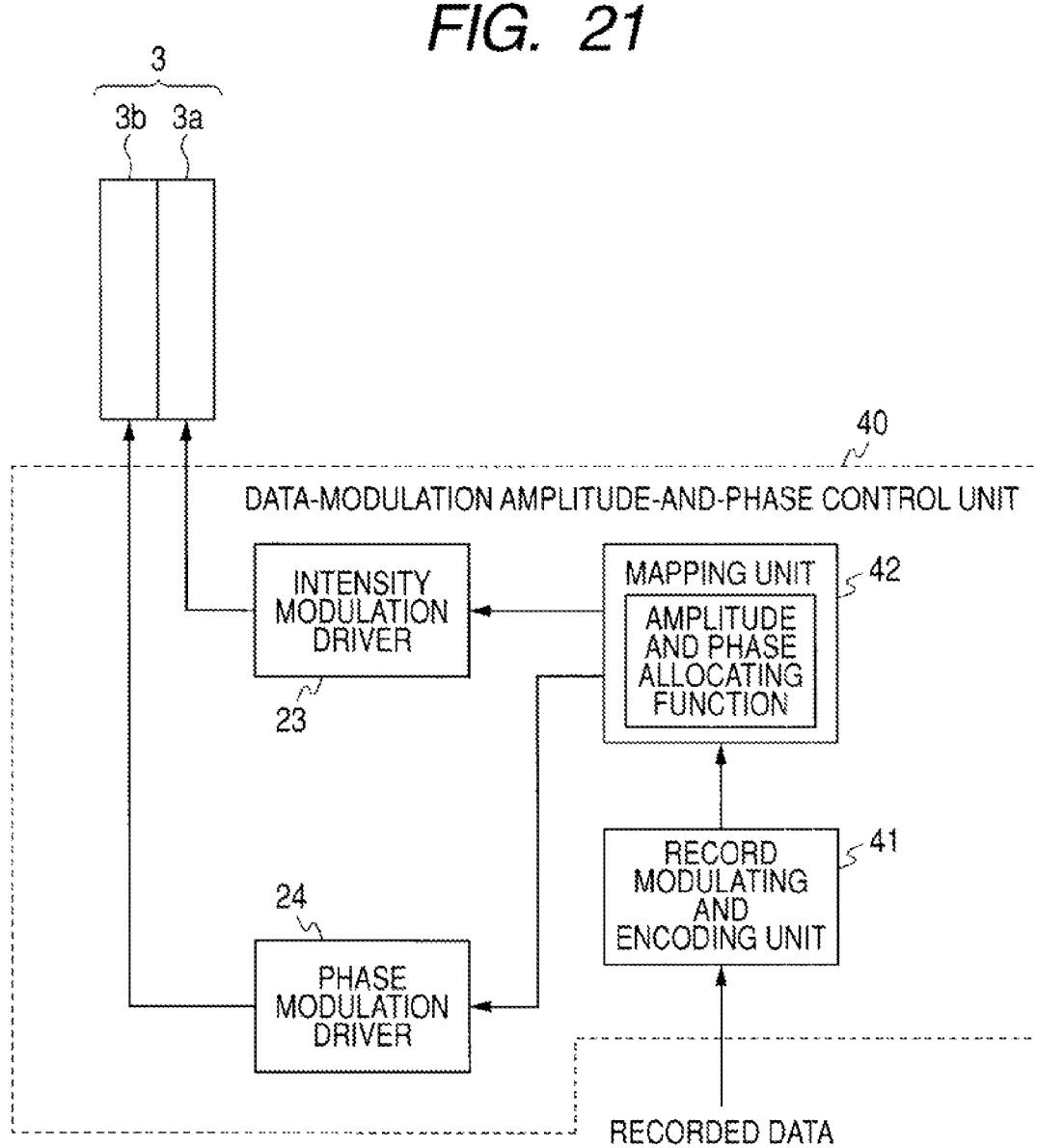
FIG. 21 is a diagram of only the structure of a spatial-light modulating unit and a data-modulation and amplitude-and-phase controlling unit for driving the spatial-light modulating unit extracted from the structure of a recording and reproducing apparatus for realizing hologram multi-value recording and reproduction according to the second embodiment.

In FIG. 21, only the structure of the SLM 3 and a data-modulation and amplitude-and-phase control unit 40 in the structure of a recording and reproducing apparatus for realizing hologram multi-value recording and reproduction according to the second embodiment is extracted and shown. In this case, the structure of an optical system of the recording and reproducing apparatus is the same as that shown in FIG. 1. In this case, components already explained above are denoted by the identical reference numerals and signs and explanation of the components is omitted.

The SLM 3 in this case is formed by integrally forming the intensity modulator 3a and the phase modulator 3b in the same manner as that shown in FIG. 9.

According to the explanation referring to FIG. 19 above, phases combined with amplitude in modulation encoding in this case are π/4, 3π/4, 5π/4, and 7π/4. In this case, as the phase modulator 3b, a phase modulator same as that used in the first embodiment is used. Since the phase modulator 3b is configured to modulate a phase to "2π" at the maximum, it is possible to perform phase modulation up to the phase "7π/4".

The data-modulation and amplitude-and-phase control unit 40 shown in FIG. 21 is included in the recording and reproducing apparatus as a section for controlling to drive the intensity modulator 3a and the phase modulator 3b in the SLM 3.

As shown in the figure, the intensity modulation driver 23 and the phase modulation driver 24 also shown in FIG. 9 are included in the data-modulation and amplitude-and-phase control unit 40 together with a record modulating and encoding unit 41 and a mapping unit 42 as shown in the figure.

First, during recording, recorded data is inputted to the data-modulation and amplitude-and-phase control unit 40. The record modulating and encoding unit 41 modulates recorded data of binary values "0" and "1" into a record symbol of a multi-value by applying multi-value modulation encoding to the recorded data inputted in this way. Specifically, in this case, the record modulating and encoding unit 41 performs the quaternary encoding explained with reference to FIG. 18 to modulate the recorded data into symbols (quaternary symbols) formed by combinations of the I data and the Q data. An example in modulating binary data into symbols formed by combinations of the I data and the Q data is as already explained. Therefore, redundant explanation of the example is omitted.

The mapping unit 42 is inputted with the quaternary symbols obtained by the modulation encoding of the record modulating and encoding unit 41 and performs mapping to obtain signal light and reference light during recording.

Concerning the signal light area A2, the mapping unit 42 maps the inputted quaternary symbols and decides positions of data pixels where the respective symbols should be arranged. Then, the mapping unit 42 allocates amplitudes and phases corresponding to values of the symbols, the arrangement positions of which are decided, to the symbols. According to the above explanation, when a combination of the I data and the Q data is (1, 1), the mapping unit 42 allocates predetermined amplitude (e.g., in this case, √2) and the phase π/4 thereto. The mapping unit 42 allocates the predetermined amplitude and the phase 3π/4 to the combination (−1, 1), allocates the predetermined amplitude and the phase 5π/4 to the combination (−1, −1), and allocates the predetermined amplitude and the phase 7π/4 to the combination (1, −1). According to such allocation, values of amplitude and a phase that should be recorded are determined for each of the pixels in the signal light area A2.

At the same time, for the area outside the signal light area A2, the mapping unit 42 generates a data pattern in which a predetermined data pattern is set only in the reference data area A1 and the phase "0" is set in all the other areas. Then, the mapping unit 42 combines such a data pattern outside the signal light area A2 and the data pattern in the signal light area A2 obtained by the allocation of amplitude described above to generate a data pattern for all effective pixels of the SLM 3 (the intensity modulator 3a).

Concerning phases, in the same manner, for the area outside the signal light area A2, the mapping unit 42 generates a data pattern in which a predetermined data pattern is set only in the reference data area A1 and the phase "0" is set in all the other areas. Then, the mapping unit 42 combines this data pattern and the data pattern in the signal light area A2 obtained by the allocation of phase described above to generate a data pattern for all effective pixels of the SLM 3 (the phase modulator 3b).

Then, the mapping unit 42 controls output voltages of respective pixels by the intensity modulation driver 23 and the phase modulation driver 24 on the basis of the respective data patterns on the amplitude side and the phase side generated in this way. In this case, as in the first embodiment, the intensity modulation driver 23 drives relevant pixels of the intensity modulator 3a with a driving voltage value based on the control (an indication value) of the mapping unit 42. The phase modulation driver 24 drives relevant pixels of the phase modulator 3b with a driving voltage value based on the control (an indication value) of the mapping unit 42.

For confirmation, in this case, an indication value given to the phase modulation driver 24 for setting a phase to the phase "π/4" is "1/8". Similarly, an indication value for setting a phase to the phase "3π/4" is "3/8", an indication value for setting a phase to the phase "5π/4" is "5/8", and an indication value for setting a phase to the phase "7π/4" is "7/8".

Since the operation during recording by the data-modulation and amplitude-and-phase control unit 40 described above is performed, signal light to which a combination of amplitude and a phase is given as a quaternary symbol for each of the pixels and reference light are outputted from the SLM 3. Consequently, it is possible to record multi-value symbols formed by combinations of amplitudes and phases on the hologram recording medium 10.

In this case, since the modulation encoding of the record modulating and encoding section 41 is performed, it is possible to record the original binary recorded data for plural bits according to the combination of amplitude and a phase recorded for each of the pixels. Consequently, an increase in a recording capacity is realized.

An operation during reproduction is explained below.

In FIG. 21, during reproduction, in the data-modulation and amplitude-and-phase control unit 40, amplitude and phase control for performing four times of light irradiation for differential detection concerning both the I axis and the Q axis described above is performed by the mapping unit 42.

Specifically, in this case, first, concerning amplitude control, the mapping unit 42 generates a data pattern in which a pattern of "0" and "1" same as that during recording is set in the reference light area A1 and the phase "0" is set in all the areas further on the outer peripheral side than the gap area A3 and the reference light area A1 and, then, a predetermined value set in advance is set in the signal light area A2. The mapping unit 42 controls an output voltage by the intensity modulation driver 23 on the basis of this data pattern.

In this case, as DC light, those of the same intensity are outputted at four times of readout. Therefore, as the amplitude control during reproduction by the mapping unit 42, only the control explained above has to be performed.

The mapping unit 42 performs, together with the amplitude control described above, processing for giving the phase differences explained with reference to FIG. 20 to the reference light area A1 and the signal light area A2.

Specifically, the mapping unit 42 sets a phase pattern of reference light the same as that during recording and, then, performs, every time one hologram page is read out, control for setting an entire phase in the signal light area A2 to "π/2" (first time), "3π/2" (second time), "0" (third time), and "π" (fourth time).

For this purpose, first, concerning the reference light area A1, the mapping unit 42 generates a predetermined data pattern for setting a phase pattern of the area the same as that during recording.

Then, as control in the first time, concerning the signal light area A2, the mapping unit 42 generates a data pattern in which the entire area is filled with a value (in this case, "1/4") corresponding to the phase "π/2". The mapping unit 42 combines this data pattern and the data pattern of the reference light area A1 to generate a data pattern for all the effective pixels of the phase modulator 3b and controls an output voltage of the phase modulation driver 24 on the basis of this data pattern.

As control in the second time, concerning the signal light area A2, the mapping unit 42 generates a data pattern in which the entire area is filled with a value ("3/4") corresponding to the phase "$3\pi/2$". The mapping unit 42 combines the data pattern and the data pattern of the reference light area A1 to generate a data pattern for all the effective pixels of the phase modulator 3b and controls an output voltage of the phase modulation driver 24 on the basis of this data pattern.

As control in the third time, concerning the signal light area A2, the mapping unit 42 generates a data pattern in which the entire area is filled with "0". The mapping unit 42 combines the data pattern and the data pattern of the reference light area A1 to generate a data pattern for all the effective pixels of the phase modulator 3b and controls an output voltage of the phase modulation driver 24 on the basis of this data pattern.

Moreover, as control in the fourth time, concerning the signal light area A2, the mapping unit 42 generates a data pattern in which the entire area is filled with a value ("1/2") corresponding to the phase "$\pi$". The mapping unit 42 combines the data pattern and the data pattern of the reference light area A1 to generate a data pattern for all the effective pixels of the phase modulator 3b and controls an output voltage of the phase modulation driver 24 on the basis of this data pattern.

According to the control during reproduction by the mapping unit 42 described above, for one hologram page recorded on the hologram recording medium 10, it is possible to irradiate a reproduced image and four kinds of DC light, phase differences of which from the reproduced image are "0", "$\pi$", "$\pi/2$", and $3\pi/2$", respectively. Consequently, two kinds of image signals for the differential detection in the I axis direction and two kinds of image signals for the differential detection in the Q axis direction can be obtained by the image sensor 11.

[Data Reproducing Unit]

Figure 22:
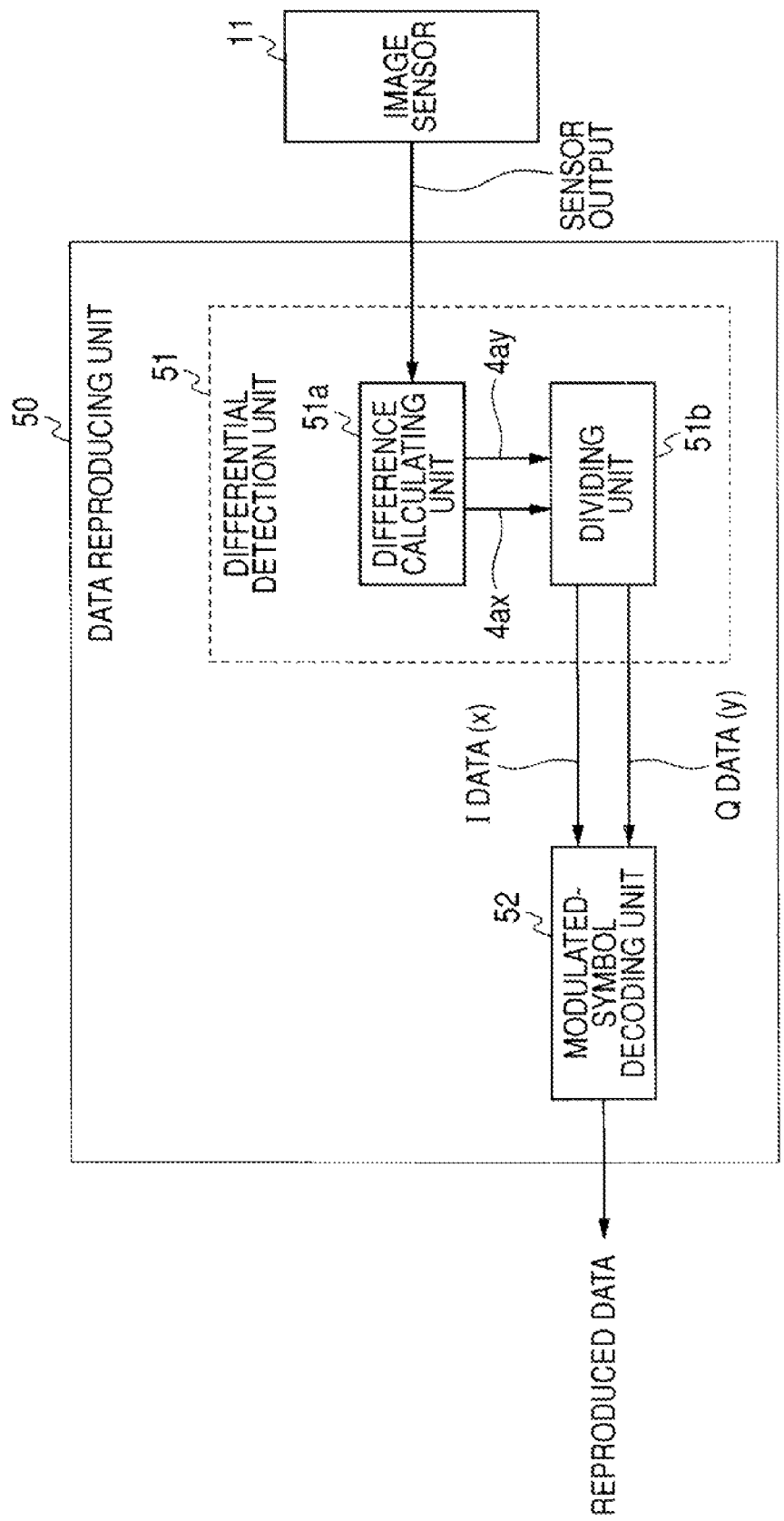
FIG. 22 is a diagram showing only the structure of an image sensor and a data reproducing unit extracted from the structure of the recording and reproducing apparatus for realizing hologram multi-value recording and reproduction according to the second embodiment.

FIG. 22 shows the structure of a data reproducing unit 50 for performing data reproduction on the basis of the four kinds of image signals in total obtained by the image sensor 11 as described above. In FIG. 22, the structure of an optical system of the recording and reproducing apparatus is not shown because the structure is the same as that explained with reference to FIG. 1 (excluding the image sensor 11).

For simplification of explanation, it is assumed that the image sensor 11 detects a value for one data pixel of the SLM 3 in one pixel thereof and the over-sampling and the up-convert processing explained with reference to FIG. 16 are not performed. Moreover, in this case, the explanation is made on the premise that the respective pixels strictly correspond to each other in a one-to-one relation between the SLM 3 side and the image sensor 11 side. The processing for positioning (the re-sampling processing) explained above is also omitted.

As shown in the figure, a differential detection unit 51 and a modulated-symbol decoding unit 52 are provided in the data reproducing unit 50.

In FIG. 22, a difference calculating unit 51a and a dividing unit 51b are provided in the differential detection unit 51. The four kinds of image signals from the image sensor 11, which are obtained for one hologram page according to the control during reproduction by the data-modulation and amplitude-and-phase control unit 40 described above, are inputted to the difference calculating unit 51a.

An image signal obtained by adding up a reproduced image and DC light, a phase difference of which from the reproduced image is "0", is represented as a first image signal. An image signal obtained by adding up the reproduced image and DC light, a phase difference of which from the reproduced image is "$\pi$", is represented as a second image signal. Similarly, an image signal obtained by adding up the reproduced image and DC light, a phase difference of which from the reproduced image is "$\pi/2$", is represented as a third image signal. An image signal obtained by adding up the reproduced image and DC light, a phase difference of which from the reproduced image is "$3\pi/2$", is represented as a forth image signal.

The difference calculating unit 51a calculates a difference ($c^2-d^2$) between the first image signal ($c^2$) and the second image signal ($d^2$) inputted from the image sensor 11 and obtains the image signal 4ax. At the same time, the difference calculating unit 51a calculates a difference ($e^2-f^2$) between the third image signal ($e^2$) and the second image signal ($f^2$) inputted from the image sensor 11 and obtains the image signal 4ay.

The dividing unit 51b divides the two kinds of image signals obtained by the difference calculating unit 51a in this way by a component 4a. This is equivalent to division of values of the respective data pixels by a value of 4a. In this case, as in the first embodiment, a value of the amplitude "a" is stored in the dividing unit 51b in advance and the dividing unit 51b performs the division described above using this value of "a".

In this case, the explanation is made on the premise that the respective pixels on the SLM 3 side and the respective pixels on the image sensor 11 side strictly correspond to each other in a one-to-one relation. Therefore, when such calculation of a difference and the division are performed, values of "x" and "y", i.e., the I data and the Q data are demodulated for each of the data pixels.

The modulated-symbol decoding unit 52 decodes a binary symbol on the basis of the two image signals ("($c^2-d^2$)/4a" and "($e^2-f^2$)/4a") obtained by the dividing unit 51b. Specifically, the modulated-symbol decoding unit 52 acquires values of the I data and the Q data (i.e., multi-value symbols) for each of the data pixels of the image signal "($c^2-d^2$)/4a" and the image signal "($e^2-f^2$)/4a". The modulated-symbol decoding unit 52 selects a combination of binary data corresponding to a combination of the I data and the Q data in accordance with a rule of modulation encoding decided in advance and outputs the combination of binary data. For example, according to the example described above, the modulated-symbol decoding unit 52 selects the pattern "11" for pixels with the combination of the I data and the Q data (1, 1), selects the pattern "10" for pixels with the combination (−1, 1), selects the pattern "01" for pixels with the combination (−1, −1), and selects the pattern "00" for pixels with the combination (1, −1) and outputs the patterns.

Since the conversion from multi-value symbols to binary symbols is performed in this way, the recorded data is reproduced.

In this case, as in the first embodiment, decoding processing only has to be processing for storing a conversion table indicating a correspondence relation between multi-value symbols and binary symbols in advance and selecting a binary symbol corresponding to a multi-value symbol on the basis of this table.

With the structure of the recording and reproducing apparatus described above, it is possible to record a multi-value symbol obtained by combining arbitrary amplitude and an arbitrary phase and it is possible to reproduce the multi-value symbol recorded by such a combination of arbitrary amplitude and an arbitrary phase.

In the case of the second embodiment, a recordable phase can be arbitrary. Therefore, in this regard, it is possible to increase phases to be combined to be larger in number than those in the first embodiment and it is possible to realize a further increase in a data recording capacity.

In the second embodiment, for convenience of explanation, the processing for positioning such as the over-sampling, the up-convert processing, and the re-sampling processing is not explained. However, when the multi-value recording and reproducing method according to the second embodiment is adopted, it is also possible to combine the processing for positioning as in the case of the first embodiment described above with the multi-value recording and reproducing method. For example, as it is known in the past, it is possible to combine a method of inserting a sync pattern in recorded data and performing positioning on the basis of a result of detecting a position of the sync pattern on the reproduction side with the multi-value recording and reproducing method. A method of positioning combined with the recording and reproducing method according to the second embodiment is not limited to such a method of inserting a sync pattern. It is also possible to combine other methods.

3. Modification

Embodiments have been explained above. However, the present application should not be limited to the examples explained so far.

For example, in the example explained above, the present application is applied to the recording and reproducing apparatus that can perform both recording and reproduction. However, the present application can also be suitably applied to a reproduction-only apparatus (a reproducing apparatus) that can perform only reproduction.

For confirmation, in the case of a reproducing apparatus based on the recording and reproducing apparatus according to the first embodiment, it is possible to provide a reproducing apparatus that can properly reproduce, from a hologram recording medium in which data sequences formed by combinations of three or more kinds of values are recorded as combinations of necessary amplitude and phases "0" and "π", the data recorded therein.

In the case of a reproducing apparatus based on the recording and reproducing apparatus according to the second embodiment, it is possible to provide a reproducing apparatus that can properly reproduce, from a hologram recording medium in which data sequences formed by combinations of three or more kinds of values are recorded as combinations of arbitrary amplitudes and arbitrary phases, the data recorded therein.

In the first embodiment, the principle of the differential detection in the I axis direction is used to an application for properly reading out multi-value symbols recorded as combinations of amplitudes and the phases "0" and "π". However, for example, it is also possible to perform, without performing multi-value encoding on the recording side, the differential detection in the I axis direction when only combinations of binary values are recorded as in the past and use the differential detection for only improvement of an SNR (an S/N ratio).

Specifically, only binary values of amplitudes "0" and "1" are used as symbols but, when "−1", "0", and "1" are recorded as a result of performing phase modulation for DC component suppression like that performed by the phase mask 13, the differential detection in the I axis direction is performed.

According to the above explanation referring to FIGS. 13A and 13B, by performing the differential detection in the I axis direction, components of "y" other than the phases "0" and "π" are offset and only components of "x", i.e., components of amplitudes of the phases "0" and "π" can be correctly obtained.

In this case, on the recording side, only components of "x" of "−1", "0", and "1" are recorded for suppression of DC components as described above. However, actually, when phase modulation of the phases "0" and "π" is performed for suppression of DC components, an intermediate phase between these phases "0" and "π" may be generated and not only the components of "x" but also the components of "y" may be given.

In this case, when the components of "y" are given, this means that, whereas a sensor output value represented as a distance from the origin is originally a distance to (x, 0), the sensor output value is represented as a distance to a different point (x, y). Therefore, it can be understood that the components of "y" are noise components with respect to the recorded information on amplitudes.

According to the differential detection in the I axis direction, the components of "y" that can be regarded as such noise components are removed. As a result, suppression of noise components generated in a readout signal is realized and improvement of the SNR is realized.

For confirmation, naturally, such an effect of the improvement of the SNR by the differential detection is obtained in the same manner when the multi-value modulation and demodulation described in the respective embodiments as examples is performed.

In the above explanation, the dividing units (31b and 51b) that divide difference calculation results, which are obtained by the difference calculating units (31a and 51a), by the component of 4a are provided to calculate values of "x" and "y". However, such a division by the component of 4a is not indispensable. For example, it is possible to omit the division by the component of 4a by performing encoding in the modulated-symbol decoding units (37 and 52) on the basis of a conversion table in which values of "x" and "y" are increased by 4a-fold.

The above explanation is made on the premise that a phase pattern of reference light during reproduction is the same as that during recording. Therefore, in the example described above, phases of DC light in performing the differential detection in the I axis direction are set to "π/2" and "3π/2" and phases of DC light in performing the differential detection in the Q axis direction are set to "0" and "π". However, these setting values of the phases are only examples. Combinations of phases set for reference light and DC lights are not limited to those described as the examples in the embodiments as long as the phases are set such that, as a result, phase differences between reproduced images and DC lights are "0" and "π" in the differential detection in the I direction and are "π/2" and "3π/2" in the differential detection in the Q axis direction.

For example, a phase pattern (a pattern of "0" and "π" in pixel units) of the reference light during reproduction is set to a pattern obtained by interchanging "0" and "π" of a phase pattern given to ON pixels (pixels to which "1" is given as intensity modulation) during recording (i.e., patterns of −1 and 1 are interchanged). This makes it possible to make a phase of the reference light different from a phase during recording by "π".

Since the phase of the reference light can be modulated to a phase different from that during recording by "π", for example, combinations of phases described below are possible.

In the case of the differential detection in the I axis direction:

(reference light phase, DC light phase)=(0, π/2), (π, π/2)

In other words, a combination in setting a phase difference between the reproduced image and the DC light to "0" is the same as that described as the example above. However, when a phase difference between the reproduced image and the DC light is set to "π", it is possible to set a phase on the reference light side to "π" and set a phase on the DC light side to "π/2".

In the case of the differential detection in the Q axis direction:

(reference light phase, DC light phase)=(π, 0), (0, 0)

In other words, a combination in setting a phase difference between the reproduced image and the DC light to "π/2" is a pattern opposite to (0, π) described as the example in the embodiment and a combination in setting a phase difference between the reproduced image and the DC light to "3π/2" is the same as that described as the example above.

The order of irradiation in the first to fourth times of the reference light and the DC lights described as the example in the above explanation is not limited to this.

In other words, in realizing the differential detection in the I axis direction and the Q axis direction, the order of irradiation of the reference light and the DC lights may be arbitrary as long as at least a reproduced image and DC lights, phase differences of which from the reproduced image are 0, π, π/2, and 3π/2, respectively, are irradiated, a difference between the first image signal obtained by adding the DC light with the phase difference 0 to the reproduced image and the second image signal obtained by adding the DC light with the phase difference π to the reproduced image is calculated, and a difference between the third image signal obtained by adding the DC light with the phase difference π/2 to the reproduced image and the fourth image signal obtained by adding the DC light with the phase difference 3π/2 to the reproduced image is calculated. These image signals are obtained as a result of the irradiation of the DC lights.

In the above explanation, the recording and reproducing apparatus is applicable to the reflective hologram recording medium 10 including the reflective film. However, the present application can also be suitably applied to a recording and reproducing apparatus that is applicable to a transmissive hologram recording medium not including the reflective film.

In that case, in a reproduction system, it is possible to remove the beam splitter (4) for guiding to the image sensor side diffractive light obtained as reflected light according to irradiated reference light. Instead, in this case, the diffractive light obtained according to the irradiation of the reference light is transmitted through the hologram recording medium itself. Therefore, the recording and reproducing apparatus only has to be configured to further provide an object lens (a condensing lens) on the opposite side of the hologram recording medium viewed from a laser beam emission point side and guide diffractive light as transmitted light to the image sensor side via the condensing lens.

For confirmation, even in the case of such a transmissive hologram recording medium, a basic operation itself of hologram recording and reproduction is the same as that in the case of the reflective hologram recording medium. The transmissive type hologram recording medium is the same as the reflective hologram recording medium in that, during recording, reference light is irradiated together with signal light and data is recorded on the hologram recording medium by an interference fringe between the signal light and the reference light and, during reproduction, the reference light and DC light are irradiated on the hologram recording medium and diffractive light (a reproduced image) obtained by the irradiation and the DC light are detected by the image sensor to reproduce data.

In the example explained above, the reference light area of a ring shape is provided on the outer side of the signal light area formed in a circular shape. However, shapes of the signal light area and the reference light area are not limited to the circular shape and the ring shape. It is also possible to arrange the reference light area on the inner side and arrange the signal light area on the outer side.

In the example explained above, the present application is applied when the coaxial system for arranging reference light and signal light on an identical axis and irradiating the reference light and the signal light on the hologram recording medium is adopted. However, the present application can also be suitably applied when a so-called two beam system for irradiating signal light and reference light at different angles is adopted.

In the example explained above, the intensity modulator that performs spatial light intensity modulation for generating signal light and reference light and the phase modulator that performs spatial light phase modulation for signal light and reference light are integrally formed. However, it is also possible to arrange the intensity modulator and the phase modulator in different positions in an optical system as separate members.

However, even if the intensity modulator and the phase modulator are configured as separate members in this way, respective pixels of the intensity modulator and the phase modulators need to strictly correspond to each other in a one-to-one relation. In other words, when the intensity modulator and the phase modulator are configured as separate members in this way, adjustment of positioning and optical magnifications thereof needs to be performed such that the respective pixels of the intensity modulator and the phase modulators need to strictly correspond to each other in a one-to-one relation.

In the above explanation, the liquid crystal panel that can variably perform intensity modulation according to a driving voltage level is used as the intensity modulator. However, as such an intensity modulator, a reflective liquid crystal panel can also be adopted other than the transmissive liquid crystal panel described in the embodiments as the example.

In the example explained above, the transmissive liquid crystal panel is used as the phase modulator. However, other devices can also be used as long as the devices can variably modulate a phase in pixel units according to a driving voltage level of each of the pixels.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording and reproducing apparatus that records data in and reproduces the data from a hologram recording medium in which the data is recorded by an interference fringe between reference light and signal light, the recording and reproducing apparatus comprising:

spatial-light-intensity modulating means for performing spatial light intensity modulation in pixel units;

spatial-light-phase modulating means for performing spatial light phase modulation in pixel units;

an optical system that transmits light emitted from a light source through the spatial-light-intensity modulating means and the spatial-light-phase modulating means and leads the light to the hologram recording medium;

converting means for converting an input data sequence formed by a combination of two kinds of values into a data sequence formed by a combination of at least three kinds of values;

amplitude-and-phase controlling means for controlling, concerning a reference light area for generating the reference light and a signal light area for generating a signal light decided in advance in the spatial-light-intensity modulating means and the spatial-light-phase modulating means, during recording, the spatial-light-intensity modulating means and the spatial-light-phase modulating means such that light intensity and a phase of each of pixels in the signal light area are a combination of necessary light intensity and a phase 0 or π allocated according to each of values of the data sequence obtained by the converting means and controlling the spatial-light-intensity modulating means and the spatial-light-phase modulating means such that light intensity and a phase in the reference light have predetermined patterns and causing the spatial-light-intensity modulating means and the spatial-light-phase modulating means to generate the signal light and the reference light, and controlling, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and π, respectively, are obtained;

image-signal acquiring means for receiving the reproduced image and the DC light obtained when two kinds of the DC light and the reference light, which are generated according to the control for each hologram page during reproduction by the amplitude-and-phase controlling means, are guided to the hologram recording medium by the optical system and obtaining two kinds of image signals based on a result of the light reception;

difference calculating means for calculating a difference between the two kinds of image signals obtained by the image-signal acquiring means; and decoding means for decoding data formed by a combination of the two kinds of values on the basis of a result of the difference calculation by the difference calculating means.

2. A recording and reproducing apparatus according to claim 1, wherein
the converting means converts the input data sequence into a data sequence formed by a combination of three kinds of values, and
the amplitude-and-phase controlling means controls intensity of each of the pixels in the signal light area in the spatial-light-intensity modulating means to be "0" or predetermined intensity other than "0" according to each of values of the data sequence obtained by the converting means.

3. A recording and reproducing apparatus according to claim 2, wherein the converting means performs, in converting the input data sequence into the data sequence formed by the combination of the three kinds of values, the conversion such that numbers of two kinds of values other than "0" are equal to each other.

4. A recording and reproducing apparatus according to claim 3, wherein the converting means converts, with 1 symbol of the input data sequence set to 8 bits or more and 1 symbol of the data sequence formed by the combination of the three kinds of values to 7 bits or more, the input data sequence into the data sequence formed by the combination of the three kinds of values.

5. A recording and reproducing method in a recording and reproducing apparatus that records data in and reproduces the data from a hologram recording medium in which the data is recorded by an interference fringe between reference light and signal light, the recording and reproducing apparatus including spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium, the recording and reproducing method comprising the steps of:

converting an input data sequence formed by a combination of two kinds of values into a data sequence formed by a combination of at least three kinds of values;

controlling, concerning a reference light area for generating the reference light and a signal light area for generating a signal light decided in advance in the spatial-light-intensity modulating means and the spatial-light-phase modulating means, during recording, light intensity and a phase of each of pixels in the signal light area are a combination of necessary light intensity and a phase 0 or π allocated according to each of values of the data sequence obtained in the converting step and controlling the spatial-light-intensity modulating means and the spatial-light-phase modulating means such that light intensity and a phase in the reference light have predetermined patterns and causing the spatial-light-intensity modulating means and the spatial-light-phase modulating means to generate the signal light and the reference light, and controlling, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and π, respectively, are obtained;

receiving the reproduced image and the DC light obtained when two kinds of the DC light and the reference light, which are generated according to the control for each hologram page during reproduction in the amplitude-and-phase controlling step, are guided to the hologram recording medium by the optical system and obtaining two kinds of image signals based on a result of the light reception;

calculating a difference between the two kinds of image signals obtained in the image-signal acquiring step; and decoding data formed by a combination of the two kinds of values on the basis of a result of the difference calculation in the difference calculating step.

6. A recording and reproducing apparatus that records data in and reproduces the data from a hologram recording medium in which the data is recorded by an interference fringe of reference light and signal light, the recording and reproducing apparatus comprising:

spatial-light-intensity modulating means for performing spatial light intensity modulation in pixel units;

spatial-light-phase modulating means for performing spatial light phase modulation in pixel units;

an optical system that transmits light emitted from a light source through the spatial-light-intensity modulating means and the spatial-light-phase modulating means and leads the light to the hologram recording medium;

converting means for converting an input data sequence formed by a combination of two kinds of values into a data sequence formed by a combination of at least four kinds of values;

amplitude-and-phase controlling means for controlling, concerning a reference light area for generating the reference light and a signal light area for generating a signal light decided in advance in the spatial-light-intensity modulating means and the spatial-light-phase modulating means, during recording, the spatial-light-intensity modulating means and the spatial-light-phase modulating means such that light intensity and a phase of each of pixels in the signal light area are modulated according to each of values of the data sequence obtained by the converting means and controlling the spatial-light-intensity modulating means and the spatial-light-phase modulating means such that light intensity and a phase in the reference light have predetermined patterns and causing the spatial-light-intensity modulating means and the spatial-light-phase modulating means to generate the signal light and the reference light, and controlling, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that four states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0, $\pi$, $\pi/2$, and $3\pi/2$, respectively, are obtained;

image-signal acquiring means for receiving the reproduced image and the DC light obtained when four kinds of the DC light and the reference light, which are generated according to the control for each hologram page during reproduction by the amplitude-and-phase controlling means, are guided to the hologram recording medium by the optical system and obtaining four kinds of image signals based on a result of the light reception;

difference calculating means for calculating a difference between two kinds of image signals obtained as a result of reception of the DC light and the reproduced image having the phase differences of 0 and $\pi$, respectively, among the four kinds of image signals obtained by the image-signal acquiring means and a difference between two kinds of image signals obtained as a result of reception of the DC light and the reproduced image having the phase differences of $\pi/2$ and $3\pi/2$, respectively, among the four kinds of image signals; and decoding means for decoding data formed by a combination of the two kinds of values on the basis of a result of the difference calculation, which is obtained by the difference calculating means, for the two kinds of image signals obtained as a result of reception of the DC light and the reproduced image having the phase differences of 0 and $\pi$ and a result of the difference calculation, which is obtained by the difference calculating means, for the two kinds of image signals obtained as a result of reception of the DC light and the reproduced image having the phase differences of $\pi/2$ and $3\pi/2$.

7. A recording and reproducing method in a recording and reproducing apparatus that records data in and reproduces the data from a hologram recording medium in which the data is recorded by an interference fringe between reference light and signal light, the recording and reproducing apparatus including spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium, the recording and reproducing method comprising the steps of:

converting an input data sequence formed by a combination of two kinds of values into a data sequence formed by a combination of at least four kinds of values;

controlling, concerning a reference light area for generating the reference light and a signal light area for generating a signal light decided in advance in the spatial-light-intensity modulating means and the spatial-light-phase modulating means, during recording, the spatial-light-intensity modulating means and the spatial-light-phase modulating means such that light intensity and a phase of each of pixels in the signal light area are modulated according to each of values of the data sequence obtained in the converting step and controlling the spatial-light-intensity modulating means and the spatial-light-phase modulating means such that light intensity and a phase in the reference light have predetermined patterns and causing the spatial-light-intensity modulating means and the spatial-light-phase modulating means to generate the signal light and the reference light, and controlling, during reproduction, for the spatial-light-intensity modulating means, light intensity of each of pixels in the reference light area and the signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that four states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0, $\pi$, $\pi/2$, and $3\pi/2$, respectively, are obtained;

receiving the reproduced image and the DC light obtained when four kinds of the DC light and the reference light, which are generated according to the control for each hologram page during reproduction in the amplitude-and-phase controlling step, are guided to the hologram recording medium by the optical system and obtaining four kinds of image signals based on a result of the light reception;

calculating a difference between two kinds of image signals obtained as a result of reception of the DC light and the reproduced image having the phase differences of 0 and $\pi$, respectively, among the four kinds of image signals obtained in the image-signal acquiring step and a difference between two kinds of image signals obtained as a result of reception of the DC light and the reproduced image having the phase differences of $\pi/2$ and $3\pi/2$, respectively, among the four kinds of image signals; and decoding data formed by a combination of the two kinds of values on the basis of a result of the difference calculation, which is obtained in the difference calculating step, for the two kinds of image signals obtained as a result of reception of the DC light and the reproduced image having the phase differences of 0 and $\pi$ and a result of the difference calculation, which is obtained in the difference calculating step, for the two kinds of image signals obtained as a result of reception of the DC light and the reproduced image having the phase differences of $\pi/2$ and $3\pi/2$.

8. A reproducing apparatus that reproduces data from a hologram recording medium in which a data sequence formed by a combination of three or more kinds of values allocated to a data sequence formed by a combination of two kinds of values is recorded as a combination of light intensity and a phase by an interference fringe between reference light and signal light, the reproducing apparatus comprising:

spatial-light-intensity modulating means for performing spatial light intensity modulation in pixel units;

spatial-light-phase modulating means for performing spatial light phase modulation in pixel units;

an optical system that transmits light emitted from a light source through the spatial-light-intensity modulating means and the spatial-light-phase modulating means and leads the light to the hologram recording medium;

amplitude-and-phase controlling means for controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and $\pi$, respectively, are obtained;

image-signal acquiring means for receiving the reproduced image and the DC light obtained when two kinds of the DC light and the reference light, which are generated according to the control for each hologram page by the amplitude-and-phase controlling means, are guided to the hologram recording medium by the optical system and obtaining two kinds of image signals based on a result of the light reception;

difference calculating means for calculating a difference between the two kinds of image signals obtained by the image-signal acquiring means; and decoding means for decoding data formed by a combination of the two kinds of values on the basis of a result of the difference calculation by the difference calculating means.

9. A reproducing method in a reproducing apparatus that reproduces data from a hologram recording medium in which a data sequence formed by a combination of three or more kinds of values allocated to a data sequence formed by a combination of two kinds of values is recorded as a combination of light intensity and a phase by an interference fringe between reference light and signal light, the reproducing apparatus including spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium, the reproducing method comprising the steps of:

controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and $\pi$, respectively, are obtained;

receiving the reproduced image and the DC light obtained when two kinds of the DC light and the reference light, which are generated according to the control for each hologram page in the amplitude-and-phase controlling step, are guided to the hologram recording medium by the optical system and obtaining two kinds of image signals based on a result of the light reception;

calculating a difference between the two kinds of image signals obtained in the image-signal acquiring step; and decoding data formed by a combination of the two kinds of values on the basis of a result of the difference calculation in the difference calculating step.

10. A reproducing apparatus that reproduces data from a hologram recording medium in which a data sequence formed by a combination of four or more kinds of values allocated to a data sequence formed by a combination of two kinds of values is recorded as a combination of light intensity and a phase by an interference fringe between reference light and signal light, the reproducing apparatus comprising:

spatial-light-intensity modulating means for performing spatial light intensity modulation in pixel units;

spatial-light-phase modulating means for performing spatial light phase modulation in pixel units;

an optical system that transmits light emitted from a light source through the spatial-light-intensity modulating means and the spatial-light-phase modulating means and leads the light to the hologram recording medium;

amplitude-and-phase controlling means for controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that four states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is $0$, $\pi$, $\pi/2$, and $3\pi/2$, respectively, are obtained;

image-signal acquiring means for receiving the reproduced image and the DC light obtained when four kinds of the DC light and the reference light, which are generated according to the control for each hologram page by the amplitude-and-phase controlling means, are guided to the hologram recording medium by the optical system and obtaining four kinds of image signals based on a result of the light reception;

difference calculating means for calculating a difference between two kinds of image signals obtained as a result of reception of the DC light and the reproduced image having the phase differences of $0$ and $\pi$, respectively, among the four kinds of image signals obtained by the image-signal acquiring means and a difference between two kinds of image signals obtained as a result of reception of the DC light and the reproduced image having the phase differences of $\pi/2$ and $3\pi/2$, respectively, among the four kinds of image signals; and decoding means for decoding data formed by a combination of the two kinds of values on the basis of a result of the difference calculation, which is obtained by the difference calculating means, for the two kinds of image signals obtained as a result of reception of the DC light and the reproduced image having the phase differences of $0$ and $\pi$ and a result of the difference calculation, which is obtained by the difference calculating means, for the two kinds of image signals obtained as a result of reception of the DC light and the reproduced image having the phase differences of $\pi/2$ and $3\pi/2$.

11. A reproducing method in a reproducing apparatus that reproduces data from a hologram recording medium in which a data sequence formed by a combination of four or more kinds of values allocated to a data sequence formed by a combination of two kinds of values is recorded as a combination of light intensity and a phase by an interference fringe between reference light and signal light, the reproducing apparatus including spatial-light-intensity modulating means for performing spatial light intensity modulation in pixel units, spatial-light-phase modulating means for performing spatial, light phase modulation in pixel units, and an optical system that transmits light emitted from a light source through the spatial-light-intensity modulating means and the spatial-light-phase modulating means and leads the light to the hologram recording medium, the reproducing method comprising the steps of:

controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that four states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is $0$, $\pi$, $\pi/2$, and $3\pi/2$, respectively, are obtained;

receiving the reproduced image and the DC light obtained when four kinds of the DC light and the reference light, which are generated according to the control for each hologram page in the amplitude-and-phase controlling step, are guided to the hologram recording medium by the optical system and obtaining four kinds of image signals based on a result of the light reception;

calculating a difference between two kinds of image signals obtained as a result of reception of the DC light and the reproduced image having the phase differences of $0$ and $\pi$, respectively, among the four kinds of image signals obtained in the image-signal acquiring step and a difference between two kinds of image signals obtained as a result of reception of the DC light and the reproduced image having the phase differences of $\pi/2$ and $3\pi/2$, respectively, among the four kinds of image signals; and decoding data formed by a combination of the two kinds of values on the basis of a result of the difference calculation, which is obtained in the difference calculating step, for the two kinds of image signals obtained as a result of reception of the DC light and the reproduced image having the phase differences of $0$ and $\pi$ and a result of the difference calculation, which is obtained in the difference calculating step, for the two kinds of image signals obtained as a result of reception of the DC light and the reproduced image having the phase differences of $\pi/2$ and $3\pi/2$.

12. A reproducing apparatus that reproduces data from a hologram recording medium in which data is recorded by an interference fringe between reference light and signal light, the reproducing apparatus comprising:

spatial-light-intensity modulating means for performing spatial light intensity modulation in pixel units;

spatial-light-phase modulating means for performing spatial light phase modulation in pixel units;

an optical system that transmits light emitted from a light source through the spatial-light-intensity modulating means and the spatial-light-phase modulating means and leads the light to the hologram recording medium;

amplitude-and-phase controlling means for controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and $\pi$, respectively, are obtained;

image-signal acquiring means for receiving the reproduced image and the DC light obtained when two kinds of the DC light and the reference light, which are generated according to the control for each hologram page by the amplitude-and-phase controlling means, are guided to the hologram recording medium by the optical system and obtaining two kinds of image signals based on a result of the light reception; and difference calculating means for calculating a difference value of between respective values forming the two kinds of image signals obtained by the image-signal acquiring means.

13. A reproducing method in a reproducing apparatus that reproduces data from a hologram recording medium in which data is recorded by an interference fringe between reference light and signal light, the reproducing apparatus including spatial-light-intensity modulating means for performing spatial light intensity modulation in pixel units, spatial-light-phase modulating means for performing spatial light phase modulation in pixel units, and an optical system that transmits light emitted from a light source through the spatial-light-intensity modulating means and the spatial-light-phase modulating means and leads the light to the hologram recording medium, the reproducing method comprising:

controlling, for the spatial-light-intensity modulating means, light intensity of each of pixels in a reference light area and a signal light area such that light intensity in the reference light area has a pattern same as that during recording and overall light intensity in the signal light area has a predetermined value and controlling, for the spatial-light-phase modulating means, every time data for one hologram page recorded on the hologram recording medium is read out, a phase of each of the pixels in the signal light area and the reference light area such that two states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference, light area, is 0 and $\pi$, respectively, area obtained;

receiving the reproduced image and the DC light obtained when two kinds of the DC light and the reference light, which are generated according to the control for each hologram page in the amplitude-and-phase controlling step, are guided to the hologram recording medium by the optical system and obtaining two kinds of image signals based on a result of the light reception; and calculating a difference value of between respective values forming the two kinds of image signals obtained in the image-signal acquiring step.

14. A recording and reproducing apparatus that records data in and reproduces the data from a hologram recording medium in which the data is recorded by an interference fringe between reference light and signal light, the recording and reproducing apparatus comprising:

a spatial-light-intensity modulating unit configured to perform spatial light intensity modulation in pixel units;

a spatial-light-phase modulating unit configured to perform spatial light phase modulation in pixel units;

an optical system that transmits light emitted from a light source through the spatial-light-intensity modulating unit and the spatial-light-phase modulating unit and leads the light to the hologram recording medium;

a converting unit configured to convert an input data sequence formed by a combination of two kinds of values into a data sequence formed by a combination of at least three kinds of values;

an amplitude and phase controlling unit configured to control, concerning a reference light area for generating the reference light and a signal light area for generating a signal light decided in advance in the spatial-light-intensity modulating unit and the spatial-light-phase modulating unit, during recording, the spatial-light-intensity modulating unit and the spatial-light-phase modulating unit such that light intensity and a phase of each of pixels in the signal light area are a combination of necessary light intensity and a phase 0 or $\pi$ allocated according to each of values of the data sequence obtained by the converting unit and control the spatial-light-intensity modulating unit and the spatial-light-phase modulating unit such that light intensity and a phase in the reference light have predetermined patterns and cause the spatial-light-intensity modulating unit and the spatial-light-phase modulating unit to generate the signal light and the reference light, and control, during reproduction, for the spatial-light-intensity modulating unit, light intensity of each of pixels in the reference light area and the signal light area such that light intensity in the reference light area has a pattern same as that during recording and overall light intensity in the signal light area has a predetermined value and controlling, for the spatial-light-phase modulating unit, every time data for one hologram page recorded on the hologram recording medium is read out, a phase of each of the pixels in the signal light area and the reference light area such that two states, i.e., states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is 0 and $\pi$, respectively, are obtained;

an image-signal acquiring unit configured to receive the reproduced image and the DC light obtained when two kinds of the DC light and the reference light, which are generated according to the control for each hologram page during reproduction by the amplitude and phase controlling unit, are guided to the hologram recording medium by the optical system and obtain two kinds of image signals based on a result of the light reception;

a difference calculating unit configured to calculate a difference between the two kinds of image signals obtained by the image-signal acquiring unit; and a decoding unit configured to decode data formed by a combination of the two kinds of values on the basis of a result of the difference calculation by the difference calculating means.

15. A recording and reproducing apparatus that records data in and reproduces the data from a hologram recording medium in which the data is recorded by an interference, fringe of reference light and signal light, the recording and reproducing apparatus comprising:

a spatial-light-intensity modulating unit configured to perform spatial light intensity modulation in pixel units;

a spatial-light-phase modulating unit configured to perform spatial light phase modulation in pixel units;

an optical system that transmits light emitted from a light source through the spatial-light-intensity modulating unit and the spatial-light-phase modulating unit and leads the light to the hologram recording medium;

a converting unit configured to convert an input data sequence formed by a combination of two kinds of values into a data sequence formed by a combination of at least four kinds of values;

an amplitude and phase controlling unit configured to control, concerning a reference light area for generating the reference light and a signal light area for generating a signal light decided in advance in the spatial-light-intensity modulating unit and the spatial-light-phase modulating unit, during recording, the spatial-light-intensity modulating unit and the spatial-light-phase modulating unit such that light intensity and a phase of each of pixels in the signal light area are modulated according to each of values of the data sequence obtained by the converting unit and control the spatial-light-intensity modulating unit and the spatial-light-phase modulating unit such that light intensity and a phase in the reference light have predetermined patterns and cause the spatial-light-intensity modulating unit and the spatial-light-phase modulating unit to generate the signal light and the reference light, and controlling, during reproduction, for the spatial-light-intensity modulating unit, light intensity of each of pixels in the reference light area and the signal light area, such that light intensity in the reference light area has a pattern same as that during recording and overall light intensity in the signal light area has a predetermined value and controlling, for the spatial-light-phase modulating unit, every time data for one hologram page recorded on the hologram recording medium is read out, a phase of each of the pixels in the signal light area and the reference light area such that four states, including states in which a phase difference between DC light obtained on the basis of control of light intensity of the signal light area and a reproduced image corresponding to data recorded of the hologram recording medium, which is obtained by irradiation of the reference light generated on the basis of control of light intensity of the reference light area, is $0$, $\pi$, $\pi/2$, and $3\pi/2$, respectively, are obtained;

an image-signal acquiring unit configured to receive the reproduced image and the DC light obtained when four kinds of the DC light and the reference light, which are generated according to the control for each hologram page during reproduction by the amplitude and phase controlling unit, are guided to the hologram recording medium by the optical system and obtaining four kinds of image signals based on a result of the light reception;

a difference calculating unit configured to calculate a difference between two kinds of image signals obtained as a result of reception of the DC light and the reproduced image having the phase differences of $0$ and $\pi$, respectively, among the four kinds of image signals obtained by the image-signal acquiring unit and a difference between two kinds of image signals obtained as a result of reception of the DC light and the reproduced image having the phase differences of $\pi/2$ and $3\pi/2$, respectively, among the four kinds of image signals; and a decoding unit configured to decode data formed by a combination of the two kinds of values on the basis of a result of the difference calculation, which is obtained by the difference calculating unit, for the two kinds of image signals obtained as a result of reception of the DC light and the reproduced image having the phase differences of $0$ and $\pi$ and a result of the difference calculation, which is obtained by the difference calculating unit, for the two kinds of image signals obtained as a result of reception of the DC light and the reproduced image having the phase differences of $\pi/2$ and $3\pi/2$.

16. A reproducing apparatus that reproduces data from a hologram recording medium in which a data sequence formed by a combination of three or more kinds of values allocated to a data sequence formed by a combination of two kinds of values is recorded as a combination of light intensity and a phase by an interference fringe between reference light and signal light, the reproducing apparatus comprising:

a spatial-light-intensity modulating unit configured to perform spatial light intensity modulation in pixel units;

a spatial-light-phase modulating unit configured to perform spatial light phase modulation in pixel units;

an optical system that transmits light emitted from a light source through the spatial-light-intensity modulating unit and the spatial-light-phase modulating unit and leads the light to the hologram recording medium;

an amplitude and phase controlling unit configured to control, for the spatial-light-intensity modulating unit, light intensity of each of pixels in a reference light area and a signal light area such that light intensity in the reference light area has a pattern same as that during recording and overall light intensity in the signal light area has a predetermined value and control, for the spatial-light-phase modulating unit, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is $0$ and $\pi$, respectively, are obtained;

an image-signal acquiring unit configured to receive the reproduced image and the DC light obtained when two kinds of the DC light and the reference light, which are generated according to the control for each hologram page by the amplitude and phase controlling unit, are guided to the hologram recording medium by the optical system and obtaining two kinds of image signals based on a result of the light reception;

a difference calculating unit configured to calculate a difference between the two kinds of image signals obtained by the image-signal acquiring unit; and a decoding unit configured to decode data formed by a combination of the two kinds of values on the basis of a result of the difference calculation by the difference calculating unit.

17. A reproducing apparatus that reproduces data from a hologram recording medium in which a data sequence formed by a combination of four or more kinds of values allocated to a data sequence formed by a combination of two kinds of values is recorded as a combination of light intensity and a phase by an interference fringe between reference light and signal light, the reproducing apparatus comprising:

a spatial-light-intensity modulating unit configured to perform spatial light intensity modulation in pixel units;

a spatial-light-phase modulating unit configured to perform spatial light phase modulation in pixel units;

an optical system that transmits light emitted from a light source through the spatial-light-intensity modulating unit and the spatial-light-phase modulating unit and leads the light to the hologram recording medium;

an amplitude and phase controlling unit configured to control, for the spatial-light-intensity modulating unit, light intensity of each of pixels in a reference light area and a signal light area such that light intensity in the reference light area has a pattern same as that during recording and overall light intensity in the signal light area has a predetermined value and control, for the spatial-light-phase modulating unit, every time data for one hologram page recorded on the hologram recording medium is read out, a phase of each of the pixels in the signal light area and the reference light area such that four states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is $0$, $\pi$, $\pi/2$; and $3\pi/2$, respectively, are obtained;

an image-signal acquiring unit configured to receive the reproduced image and the DC light obtained when four kinds of the DC light and the reference light, which are generated according to the control for each hologram page by the amplitude and phase controlling unit, are guided to the hologram recording medium by the optical system and obtaining four kinds of image signals based on a result of the light reception;

a difference calculating unit configured to calculate a difference between two kinds of image signals obtained as a result of reception of the DC light and the reproduced image having the phase differences of $0$ and $\pi$, respectively, among the four kinds of image signals obtained by the image-signal acquiring unit and a difference between two kinds of image signals obtained as a result of reception of the DC light and the reproduced image having the phase differences of $\pi/2$ and $3\pi/2$, respectively, among the four kinds of image signals; and a decoding unit configured to decode data formed by a combination of the two kinds of values on the basis of a result of the difference calculation, which is obtained by the difference calculating unit, for the two kinds of image signals obtained as a result of reception of the DC light and the reproduced image having the phase differences of $0$ and $\pi$ and a result of the difference calculation, which is obtained by the difference calculating unit, for the two kinds of image signals obtained as a result of reception of the DC light and the reproduced image having the phase differences of $\pi/2$ and $3\pi/2$.

18. A reproducing apparatus that reproduces data from a hologram recording medium in which data is recorded by an interference fringe between reference light and signal light, the reproducing apparatus comprising:

a spatial-light-intensity modulating unit configured to perform spatial light intensity modulation in pixel units;

a spatial-light-phase modulating unit configured to perform spatial light phase modulation in pixel units;

an optical system that transmits light emitted from a light source through the spatial-light-intensity modulating unit and the spatial-light-phase modulating unit and leads the light to the hologram recording medium;

an amplitude and phase controlling configured to control, for the spatial-light-intensity modulating unit, light intensity of each of pixels in a reference light area and a signal light area such that light intensity in the reference light area has a pattern same as that during recording and overall light intensity in the signal light area has a predetermined value and control, for the spatial-light-phase modulating unit, every time data for one hologram page recorded on the hologram recording medium is read out, a phase of each of the pixels in the signal light area and the reference light area such that two states, including states in which a phase difference between DC light obtained on the basis of control of light intensity of the signal light area and a reproduced image corresponding to data recorded on the hologram recording medium, which is obtained by irradiation of the reference light generated on the basis of control of light intensity of the reference light area, is $0$ and $\pi$, respectively, are obtained;

an image-signal acquiring unit configured to receive the reproduced image and the DC light obtained when two kinds of the DC light and the reference light, which are generated according to the control for each hologram page by the amplitude and phase controlling unit, are guided to the hologram recording medium by the optical system and obtaining two kinds of image signals based on a result of the light reception; and a difference calculating unit configured to calculate a difference value of between respective values forming the two kinds of image signals obtained by the image-signal acquiring unit.

* * * * *